United States Patent [19]
Schneider

[11] Patent Number: 5,987,464
[45] Date of Patent: Nov. 16, 1999

[54] METHOD AND SYSTEM FOR PERIODICALLY UPDATING DATA RECORDS HAVING AN EXPIRY TIME

[76] Inventor: Eric Schneider, 2452 Fairmount Blvd. Suite 401, Cleveland Heights, Ohio 44106

[21] Appl. No.: 08/900,437

[22] Filed: Jul. 25, 1997

Related U.S. Application Data

[60] Provisional application No. 60/022,714, Jul. 26, 1996.
[51] Int. Cl.[6] .................................................. G06F 17/30
[52] U.S. Cl. ............................ 707/10; 707/104; 707/103
[58] Field of Search ..................................... 707/200, 202, 707/103, 10, 104; 395/329, 51, 333, 701, 500, 375; 380/4

[56] References Cited

U.S. PATENT DOCUMENTS

| | | |
|---|---|---|
| 4,823,265 | 4/1989 | Nelson . |
| 5,155,837 | 10/1992 | Liu et al. ................................ 395/500 |
| 5,155,847 | 10/1992 | Kirouac et al. . |
| 5,175,681 | 12/1992 | Iwai et al. . |
| 5,231,570 | 7/1993 | Lee . |
| 5,249,230 | 9/1993 | Mihm, Jr. .................................. 380/23 |
| 5,249,275 | 9/1993 | Srivastava ................................ 395/375 |
| 5,319,699 | 6/1994 | Kerihuel et al. ......................... 455/461 |
| 5,386,369 | 1/1995 | Christiano . |
| 5,402,490 | 3/1995 | Mihm, Jr. .................................. 380/21 |
| 5,404,505 | 4/1995 | Levinson . |
| 5,444,823 | 8/1995 | Nguyen ..................................... 395/51 |
| 5,592,620 | 1/1997 | Chen et al. . |
| 5,600,778 | 2/1997 | Swanson et al. ......................... 395/333 |
| 5,603,034 | 2/1997 | Swanson .................................. 395/701 |
| 5,623,679 | 4/1997 | Rivette et al. . |
| 5,623,681 | 4/1997 | Rivette et al. . |
| 5,625,818 | 4/1997 | Zarmer et al. . |
| 5,634,016 | 5/1997 | Steadham, Jr. et al. ................. 395/329 |
| 5,640,561 | 6/1997 | Satoh et al. ............................. 707/202 |
| 5,692,132 | 11/1997 | Hogan ....................................... 705/27 |
| 5,699,428 | 12/1997 | McDonnal et al. ......................... 380/4 |
| 5,701,399 | 12/1997 | Lee et al. .................................. 395/51 |
| 5,708,709 | 1/1998 | Rose ........................................... 380/4 |
| 5,742,818 | 4/1998 | Shoroff et al. .......................... 707/200 |
| 5,802,524 | 9/1998 | Flowers et al. .......................... 707/103 |

*Primary Examiner*—Thomas G. Black
*Assistant Examiner*—Frantz Coby

[57] ABSTRACT

A method and system for information delivery of a computer system. The method includes the steps of storing a first data including a program and potentially reusable data on a storage medium of a computer system. In turn, a second data including control data is subsequently stored on the same storage medium as the first data. The contents of the control data is unknown at the time the first data was stored. The control data corresponds to a subset of the potentially reusable data. The program is executed and combines the control data and the potentially reusable data to create on the storage medium of the computer system a third data including newly indexed available information. Information is delivered by sending a plurality of transmissions where known data is sent in advance to minimize the subsequent delivery of unknown control data that becomes known based upon a future event.

25 Claims, 20 Drawing Sheets

| DATE | Min 4 | Max 4 | Min 8 | Max 8 | Min 12 | Max 12 |
|---|---|---|---|---|---|---|
| 1996-12-31 | 5155863 | 5157786 | 4777665 | 4779287 | 4477927 | 4479266 |
| 1996-12-24 | 5153938 | 5155862 | 4776042 | 4777664 | 4476587 | 4477926 |
| 1996-12-17 | 5152013 | 5153937 | 4774723 | 4776041 | 4475247 | 4476586 |
| 1996-12-10 | 5150475 | 5152012 | 4773100 | 4774722 | 4473907 | 4475246 |
| 1996-12-03 | 5148549 | 5150474 | 4771477 | 4773099 | 4472835 | 4473906 |
| 1996-11-26 | 5146621 | 5148548 | 4769854 | 4771476 | 4471495 | 4472834 |
| 1996-11-19 | 5144694 | 5146620 | 4768231 | 4769853 | 4470155 | 4471494 |
| 1996-11-12 | 5142702 | 5144693 | 4766608 | 4768230 | 4468815 | 4470154 |
| 1996-11-05 | 5140707 | 5142701 | 4764985 | 4766607 | 4467475 | 4468814 |
| 1996-10-29 | 5138714 | 5140706 | 4763362 | 4764984 | 4466135 | 4467474 |
| 1996-10-22 | 5136721 | 5138713 | 4761834 | 4763361 | 4464795 | 4466134 |
| 1996-10-15 | 5134725 | 5136720 | 4760610 | 4761833 | 4463455 | 4464794 |
| 1996-10-08 | 5133084 | 5134724 | 4759082 | 4760609 | 4462115 | 4463454 |
| 1996-10-01 | 5131093 | 5133083 | 4757554 | 4759081 | 4461043 | 4462114 |
| 1996-09-24 | 5129101 | 5131092 | 4756026 | 4757553 | 4459703 | 4461042 |
| 1996-09-17 | 5127105 | 5129100 | 4754498 | 4756025 | 4458363 | 4459702 |
| 1996-09-10 | 5125113 | 5127104 | 4752970 | 4754497 | 4457023 | 4458362 |
| 1996-09-03 | 5123113 | 5125112 | 4751746 | 4752969 | 4455683 | 4457022 |
| 1996-08-27 | 5121505 | 5123112 | 4750218 | 4751745 | 4454611 | 4455682 |
| 1996-08-20 | 5119510 | 5121504 | 4748690 | 4750217 | 4453271 | 4454610 |
| 1996-08-13 | 5117506 | 5119509 | 4747162 | 4748689 | 4451931 | 4453270 |
| 1996-08-06 | 5115516 | 5117505 | 4745634 | 4747161 | 4450591 | 4451930 |
| 1996-07-30 | 5113526 | 5115515 | 4744106 | 4745633 | 4449251 | 4450590 |
| 1996-07-23 | 5111536 | 5113525 | 4742578 | 4744105 | 4447911 | 4449250 |
| 1996-07-16 | 5109546 | 5111535 | 4741050 | 4742577 | 4446571 | 4447910 |
| 1996-07-09 | 5107542 | 5109545 | 4739522 | 4741049 | 4445231 | 4446570 |
| 1996-07-02 | 5105473 | 5107541 | 4737994 | 4739521 | 4443891 | 4445230 |

FIG. 7B

| DATE | 4 | 8 | 12 | Total | Bytes | | M 8 | M 12 | BITS | E-Mail |
|---|---|---|---|---|---|---|---|---|---|---|
| 1996-12-31 | 1924 | 1623 | 1340 | 4887 | 611 | | 1289 | 789 | 4002 | 501 |
| 1996-12-24 | 1925 | 1623 | 1340 | 4888 | 611 | | 1283 | 787 | 3995 | 500 |
| 1996-12-17 | 1925 | 1319 | 1340 | 4584 | 573 | | 1050 | 770 | 3745 | 469 |
| 1996-12-10 | 1538 | 1623 | 1340 | 4501 | 563 | | 1328 | 793 | 3659 | 458 |
| 1996-12-03 | 1926 | 1623 | 1072 | 4621 | 578 | | 1310 | 653 | 3889 | 487 |
| 1996-11-26 | 1928 | 1623 | 1340 | 4891 | 612 | | 1284 | 769 | 3981 | 498 |
| 1996-11-19 | 1927 | 1623 | 1340 | 4890 | 612 | | 1278 | 798 | 4003 | 501 |
| 1996-11-12 | 1992 | 1623 | 1340 | 4955 | 620 | | 1309 | 798 | 4099 | 513 |
| 1996-11-05 | 1995 | 1623 | 1340 | 4958 | 620 | | 1299 | 805 | 4099 | 513 |
| 1996-10-29 | 1993 | 1623 | 1340 | 4956 | 620 | | 1312 | 821 | 4126 | 516 |
| 1996-10-22 | 1993 | 1528 | 1340 | 4861 | 608 | | 1214 | 764 | 3971 | 497 |
| 1996-10-15 | 1996 | 1224 | 1340 | 4560 | 570 | | 1017 | 763 | 3776 | 472 |
| 1996-10-08 | 1641 | 1528 | 1340 | 4509 | 564 | | 1218 | 779 | 3638 | 455 |
| 1996-10-01 | 1991 | 1528 | 1072 | 4591 | 574 | | 1235 | 613 | 3839 | 480 |
| 1996-09-24 | 1992 | 1528 | 1340 | 4860 | 608 | | 1235 | 827 | 4054 | 507 |
| 1996-09-17 | 1996 | 1528 | 1340 | 4864 | 608 | | 1237 | 781 | 4014 | 502 |
| 1996-09-10 | 1992 | 1528 | 1340 | 4860 | 608 | | 1221 | 823 | 4036 | 505 |
| 1996-09-03 | 2000 | 1224 | 1340 | 4564 | 571 | | 1008 | 818 | 3826 | 479 |
| 1996-08-27 | 1608 | 1528 | 1072 | 4208 | 526 | | 1252 | 622 | 3482 | 436 |
| 1996-08-20 | 1995 | 1528 | 1340 | 4863 | 608 | | 1268 | 798 | 4061 | 508 |
| 1996-08-13 | 2004 | 1528 | 1340 | 4872 | 609 | | 1272 | 823 | 4099 | 513 |
| 1996-08-06 | 1990 | 1528 | 1340 | 4858 | 608 | | 1231 | 793 | 4014 | 502 |
| 1996-07-30 | 1990 | 1528 | 1340 | 4858 | 608 | | 1245 | 811 | 4046 | 506 |
| 1996-07-23 | 1990 | 1528 | 1340 | 4858 | 608 | | 1247 | 799 | 4036 | 505 |
| 1996-07-16 | 1990 | 1528 | 1340 | 4858 | 608 | | 1252 | 818 | 4060 | 508 |
| 1996-07-09 | 2004 | 1528 | 1340 | 4872 | 609 | | 1247 | 837 | 4088 | 511 |
| 1996-07-02 | 2069 | 1528 | 1340 | 4937 | 618 | | 1247 | 839 | 4155 | 520 |

| | |
|---|---|
| 4 = | Total Patents Issued in a given week 4 years ago. |
| 8 = | Total Patents Issued in a given week 8 years ago. |
| 12 = | Total Patents Issued in a given week 12 years ago. |
| Total = | (4+8+12 columns)   Total Patents that can potentially expire in a given week. |
| Bytes = | (4+8+12 columns)/8   represents the maximum minimized transmission in Bytes of data needed to complete delivery. |
| M8 = | Modified Total of 8 year patents that can expire in a given week. (a portion of the 8 year patents have already expired 4 years ago) |
| M12 = | Modified Total of 12 year patents that can expire in a given week. (a portion of the 12 year patents have already expired 4 and 8 years ago) |
| Bits = | Represents a modified total number of patents that can potentially expire in a given week. |
| E-Mail = | Represents a modified minimized final delivery of data in Bytes. |

| | Issue Date | Patent Number | 1 | 2 | 3 | 4 | 5 | 6 | 7 | 8 | |
|---|---|---|---|---|---|---|---|---|---|---|---|
| USPTO APS Patent Data | 03/17/87 | 4650008 | F | 12 | T | 8 | F | 4 | 03/17/99 | L | Other Status Data |
| | 03/17/87 | 4650007 | F | 12 | T | 8 | T | 8 | 03/17/99 | J | |
| | 03/17/87 | 4650006 | T | 8 | T | 4 | F | 4 | 03/17/95 | H | |
| | 03/17/87 | 4650005 | T | 4 | F | 4 | F | 4 | 03/17/91 | E | |
| | 03/17/87 | 4650004 | T | 4 | F | 4 | F | 4 | 03/17/91 | E | |
| | 03/17/87 | 4650003 | F | 12 | T | 8 | F | 4 | 03/17/99 | A | |
| | 03/17/87 | 4650002 | T | 4 | F | 4 | F | 4 | 03/17/91 | E | |
| | 03/17/87 | 4650001 | F | 12 | T | 8 | F | 4 | 03/17/99 | H | | etc... /422

E1= 4 year Expiration
R1= 4 year Reinstatement
E2= 8 year Expiration
R2= 8 year Reinstatement
E3= 12 year Expiration
R3= 12 year Reinstatement 1= Expired Flag
2= Potential Expired Level
3= Renewal Flag
4= Potential Renewal Level
5= Reinstatement Flag
6= Potential Reinstatment Level
7= Potential Date of Expiration
8= Expiration Status History

| 8 | R3 | E3 | R2 | E2 | R1 | E1 |
|---|---|---|---|---|---|---|
| A | | | | | | |
| B | | | | | | X |
| C | | | | | X | |
| D | | | | X | X | |
| E | | | X | | X | |
| F | | X | X | | X | |
| G | X | | X | | X | |
| H | | | | X | | |
| I | | | | X | | |
| J | | X | X | | | |
| K | X | | X | | | |
| L | X | | | | | |
| M | X | | | | | |

/424

| Patent Number | 1 | 2 | 7 |
|---|---|---|---|
| 4650008 | F | 12 | 03/17/99 |
| 4650007 | F | 12 | 03/17/99 |
| 4650003 | F | 12 | 03/17/99 |
| 4650001 | F | 12 | 03/17/99 |

→ Potentially Reusable Data /30

| | Issue Date | Patent Number | 1 | 2 | 3 | 4 | 5 | 6 | 7 | 8 |
|---|---|---|---|---|---|---|---|---|---|---|
| 426 | 03/17/87 | 4650005 | F | 4 | F | 4 | F | 4 | 03/17/91 | A |
| 428 | 03/17/87 | 4650005 | F | 8 | T | 4 | F | 4 | 03/17/95 | A |
| 430 | 03/17/87 | 4650005 | T | 8 | T | 4 | F | 4 | 03/17/95 | H |
| 432 | 03/17/87 | 4650005 | F | 12 | T | 8 | T | 8 | 03/17/99 | I |

METHOD AND SYSTEM FOR PERIODICALLY UPDATING DATA RECORDS HAVING AN EXPIRY TIME

This application claims benefit of Provisional application 60/022,714 filed Jul. 26, 1996.

FIELD OF THE INVENTION

This invention generally relates to a method and system of information delivery, and more specifically relates to a method and system which optimizes the delivery of time sensitive information.

BACKGROUND OF THE INVENTION

As technology progresses in the digital age, there has been the continued challenge to serve the growing and changing information needs of society. Technology has constantly reinvented new ways of utilizing data by optimizing the space and time necessary for the storage, transfer, compilation, and arrangement of information. Methods of data delivery have included the compression and/or ciphering of data sent via floppy diskette, compact disc (CD-ROM), or e-mail and by receiving data from centralized sources such as the Internet, Bulletin Board System (BBS), or other on-line services.

A variety of recent advances in data delivery methods are known such as: metering the on-site usage of licensed software on fixed media; remote installation of software upgrades; and data on-demand services which offer novel ways for optimizing customized data distribution to subscribers. The common focus of these methods is splitting and recombining information in order to achieve more progressive solutions for data delivery. However, due to subscription data size and limited end user technology to support such information, the commercial data vendor in an effort to manage profit and control achieves delivery by maintaining an on-line centralized database where the subscriber uses a centralized information delivery program to download information from and have conditional access to.

Such centralized information delivery programs rely on a fairly extensive library of known desired data. As a result, new data with references not listed in the original library files are unknown to the subscriber. Thus, the reference libraries require frequent updates to remain current with the new data. If the information provider is lax in providing updates, or the subscriber is lax in obtaining and employing available updates, the centralized information delivery program may become obsolete within only a few months after installation. Furthermore, the centralization of information oftentimes results in placing greater demands on data search engines. For example, when querying from a centralized data source, substantially all of the data is searched by the search engine in order to perform retrievals. Such an exhaustive search may result in a longer period of time for the search engine to complete its task.

On-line databases, since their inception, have been the most desirable way to access information from large bodies of data. This was especially the case in the early 1980's when off-line desktop storage was at a premium and data transmission speed was slow. Lobby power helped influence the defining of boundaries between the government's mission of information dissemination and issues of competition with the private sector. The Reagan administration issued a proposal to prevent government agencies from providing on-line access, restricting the federal role of government to that of a wholesaler. Monopolies were forged with select commercial data vendors in the private sector to provide access to public information. Few could afford the expense of buying data up-front for the luxury and privacy of having unlimited searching and retrieval of this information off-line. As a result, searching and retrieval have been limited to either strictly on-line systems or strictly off-line systems. The introduction of CD-ROM, has allowed providers to distribute discs that contain summaries or abstracts of the full document, and reach a larger market at a better price. Although files with frequent updates are not best suited CD-ROM, this advance helped the subscriber search off-line and decide what documents were to be ordered. Compact discs have marked a clear beginning for a hybrid search and retrieval system to evolve and bring both together.

Such is the case in the area of patents. In exchange for disclosure of an invention, the issuance of a U.S. patent is a twenty year grant from the time filed by the government of a property right to the inventor to 'exclude others from making, using, or selling the invention', with the patentee losing rights to the invention upon expiration. Title 37 Code of Federal Regulations (CFR), Section 1.362(d) provides that maintenance fees may be paid without surcharge for the six-month period beginning three, seven, and eleven years after the date of issue of patents based on applications filed on or after Dec. 12, 1980. An additional six-month grace period is provided by 35 U.S.C. 41(b) and 37 CFR 1.362(e) for payment of the maintenance fee with the surcharge set forth in 37 CFR 1.20(h), as amended effective Dec. 16, 1991. If the maintenance fee is not paid in the patent requiring such payment the patent will expire on the fourth, eighth, or twelfth anniversary of the grant. Eleven years since the first premature patent expiration in December 1985, over 275,000 patents have prematurely expired and entered the public domain with an additional 1,000 patents prematurely expiring each week.

The most common use of patent information and an early step in assessing the patentability of an invention is to perform prior art searches of existing patents. To assist patent examiners, the Automated Patent System (APS) was implemented in April of 1984 by the U.S. Patent and Trademark Office (PTO) with over 400 million dollars of taxpayer money to provide sophisticated centralized on-line search capabilities. By accessing the APS database from a computer, an examiner can select patents for review based on the occurrence of specified words or phases, in particular combinations, in the document. The U.S. Congress has long recognized the importance of information dissemination to the PTO's mission. The PTO enabling legislation has several sections addressing information dissemination; the most relevant of these being the requirement that the PTO provide the public with direct access to its search systems. Consequently, the APS database has been available to the public in the PTO Public Search Room since 1990 and, initially on an experimental basis, in 14 of the 74 Patent and Trademark Depository Libraries since 1992.

Virtually all information concerning the content of U.S. patents offered by commercial data vendors is based on data furnished by the PTO. At present, the most prevalent mode of transferring data to the vendor community from the PTO is in the form of files on magnetic tape. For example, the PTO offers copies of the tapes that contain the text used as input in the building of the APS database. The premature expiration of a patent has never been a search requirement for the patent examiner. As a result, there has been no need for the PTO to incorporate this new reference information into the APS database. Currently, the APS database is the representation of the original library files of patent text data at the time of issuance and does not provide a data field for the premature expiration status of a patent. Even though this is the primary source of data provided for sale by the PTO, commercial data vendors in turn have not recognized the potentially unrealized value of premature expiration information.

It is the government's responsibility to publish what the public can not make, use, or sell. Aside from disclosure of the full patent document, the government also publishes the front page information of the patent document in the Official Gazette. The following is from Chapter 2575 of the Manual of Patent Examining Procedure (MPEP) Sixth Edition, Revision 1, September 1995.

> A notice will appear in each issue of the Official Gazette which will indicate which patents have been granted 3, 7, and 11 years earlier, that the window period has opened, and that maintenance fee payments will now be accepted for those patents. Another Official Gazette notice published after expiration of the grace period will indicate any patent which has prematurely expired due to nonpayment of maintenance fees and any patents which have been reinstated. An annual compilation of such expirations and reinstatements will also be published.

This passage denotes the intention of the government to publish what the public can make, use, or sell. All patents prior to December 1985, expire seventeen years after being granted. For example, if it is the first week of the year 1996 and the public wanted to read what patents had just expired, one would look at the Official Gazette from the first week of 1979. Essentially a book published exactly seventeen years ago would be retrieved. For the first 195 years of the U.S. Patent System, there was no need to republish or compile expired patent information because it was previously published by default.

On Dec. 10, 1985, nearly 200 years since the first patent issued, the Official Gazette (OG) Notice had listed Pat. No. 4,291,808 to become the first patent ever to prematurely expire for failure to pay maintenance fees. Since then, the PTO has published weekly in the OG notices the patent numbers of the expiring patents. The release of the patent numbers only, limits the public to a manual, exhaustive, and inefficient cross-referenced retrieval of the newest patent documents that have prematurely expired, thereby creating for the first time a new need to compile this information. In 1990, the PTO released a series of CD-ROM subscription products including the Classification and Search Support Information System Bibliographic disc (CASSIS-BIB). This disc offers the search and retrieval of title-only patent information dating back to 1969. The subscriber can search for the status of a patent (withdrawn, reinstated, abandoned, or prematurely expired) and view the most current list of premature expired patents. Although the release of the CASSIS-BIB disc can help with the search of patent expirations and allows the subscriber the privacy and cost benefits of such a system, searching is limited to patent titles only, the disc is updated every two months and is not cost effective to update more frequently.

Because of significant changes in technology, revisions to the Office of Management and Budget (OMB) Circular A-130, and the passage of the Paperwork Reduction Act of 1995 (Public Law 104-13), public access has further expanded through a variety of programs administered by the PTO's Office of Information Dissemination to include the access of patent and trademark information made available via the Internet and PTO Bulletin Board System (PTO-BBS). Upon browsing Internet sites, patent servers at the Center for Networked Information Discovery and Retrieval (CNIDR), Community of Science, Chemical Abstracts Society (CAS), and IBM to name a few, have all neglected to allow searching for the expiration status of a patent. The IBM Patent Server has come closest to this accomplishment where on Jun. 4, 1997, a maintenance status field was integrated into the database which lists the status of a patent upon retrieval only, and is not yet a searchable field.

In November of 1994 the PTO established an on-line BBS. The PTO began to list exclusive files of premature expired patent numbers weekly and list master files of premature expired patent numbers every two months. The patent numbers are published in natural ascending order, and for more than ten years have been keyed in manually by the PTO. As a result, it is not uncommon to see occasional errors like the reversal of digits within the patent number based on an operator's manual entry. In 1995, the PTO added the release of the OG Notices on-line. In the OG Notice on Feb. 6, 1996, the PTO published the premature expired patent numbers for the week of Feb. 13, 1996 instead of the current week. On Mar. 12, 1996 the OG corrected the omission while the PTO-BBS did not. Since then, the exclusive files have been reported one week ahead of the OG Notices upon issue. The master list of premature expired patent numbers released on the PTO-BBS for Dec. 31, 1996 omitted about 6,000 premature expired patent numbers. This omission represents the eight and twelve year expirations since the previous master list on Oct. 31, 1996. This omission is in turn reflected in the December 1996 issue of the CASSIS-BIB CD-ROM. There were further omissions in the February 1997 issue and the CASSIS-BIB subscription disc does not remain corrected to this date. In May 1997, the PTO-BBS shut down due to a diminished user base and the increasing popularity of the Internet. The above inconsistencies indicate that there is no system for detecting error or omission that may be subject to manual labor or clerical errors. The issuance of the premature expired patent numbers by the PTO has now become questionable in regard to method, policy, and accuracy of its use.

The conditions of centralization first mentioned have allowed for industry to overlook novel solutions for the dissemination of newly available information. Accordingly, in light of the above, there is a strong need in the art for a novel system and method for updating information/reference files of a computer and/or computer system without putting the onus of updating on the subscriber so that an information program stored thereon is kept current. Moreover, there is a strong need to improve a system and method to optimize the search, retrieval, reporting, delivery, and update of master database information and newly available information for both on-line and off-line systems.

SUMMARY OF THE INVENTION

The present invention in particular relates to a system and method for updating patent files of a computer and/or computer system so that the patent files will include newly issued patents and premature expired ones. However, as will be discussed below, the present invention has applicability to updating a variety of types of reference data files of a computer and/or computer system without putting the onus of updating on the subscriber.

Briefly, the present invention provides a portable storage media such as a floppy disk, CD-ROM or DVD-ROM that is being used to install a program, reference data files or other data to a computer or computer system. At subsequent intervals, new issue data, news and advertising data, renewal and reinstatement data, and control data are also provided to the computer or computer system. The control data being downloaded is a representation of the most recently available data references. The computer or computer system receiving the files creates a subset of reference data files to be queried, browsed, searched, selected, reported, archived, ordered, or hyperlinked. Thus, according to the present invention, a computer system's information reference data files are automatically updated and indexed with the installation of new data and/or programs.

There are many types of information delivery programs that the present invention will benefit. For example, there are newly issued and premature expired patent and trademark providing programs, and job and housing availability programs to name a few. The aforementioned updating problem is prevalent in all areas where a particular software utilizes reference files that need to be updated frequently in order for the system using the software to operate at peak efficiency.

As was mentioned above, the present invention can be utilized to update any suitable reference files of a computer and/or computer system without putting the onus of updating on the user.

According to one particular aspect of the present invention, a method for creating data files of a computer system is provided including the steps of: storing first data on a storage medium of the computer system, the first data including an executable program and data files; subsequently storing second data on the storage medium of the computer system; and using the second data to create third data on the storage medium, wherein the third data is an updated subset of the data files.

According to yet another aspect of the present invention, a computer system is provided including: at least one computer; and a storage medium coupleable to the at least one computer, the storage medium adapted to deliver data to the at least one computer, the storage medium including first and second data; wherein the first data includes an executable program and data files, the second data is used to create third data on the storage medium, the third data being an updated subset of the data files.

In accordance with yet another aspect of the invention, a method for creating data files of a computer system is provided including the steps of: storing first data on a storage medium of the computer system, the first data including an executable program and data files, the data files including potentially reusable data; subsequently storing second data on the storage medium of the computer system, the second data including data that corresponds to a subset of records of the data files; and executing the program for combining the second data with the data files to create third data on the storage medium, the third data including newly indexed available information, wherein the third data is an updated subset of the data files.

The present invention optimizes the on-line transmission size of time sensitive information to a subscriber. The invention utilizes renewal information and previous expiration information to increase the subscription period. The invention offers an automated clipping service to encourage the potential use and easier access of information to the public.

The present invention offers an automated preview service that utilizes the time delay between receiving control data for building newly available information and receiving newly issued information. The invention reduces the search and retrieval time for accessing master database information and newly available information. The present invention also implements methods of verification to assure the accuracy and reliability of newly available information. The invention streamlines the document delivery process by accessing document images off-line. The invention maintains privacy of a subscriber's query off-line and when possible limits on-line to retrieval only, of for querying non-semantic or keyword search strategies, such as but not limited to classification and cross-reference searching.

The aforementioned program can be executed to combine the data from both deliveries and build newly indexed data files in storage. The new data is then sent to the display of the computer system and through the use of a computer user interface, the subscriber can configure, query, browse, select, report, archive, order, or hyperlink from the search engine. If so desired, the subscriber can connect to the Internet or other on-line services via the transceiver of the computer system to view a selected document image and send order or other information to the provider. The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

BRIEF DESCRIPTION OF THE DRAWINGS

FIG. 7b is a lookup table used to determine if a patent number falls within an expected range of patent numbers in accordance with the present invention;

FIG. 10a is a table showing the projected delivery size of the control data in accordance with the present invention;

FIG. 14 is a diagram of data structures pertaining to status updates in patent databases in accordance with the present invention;

DETAILED DESCRIPTION OF THE INVENTION

Figure 1:
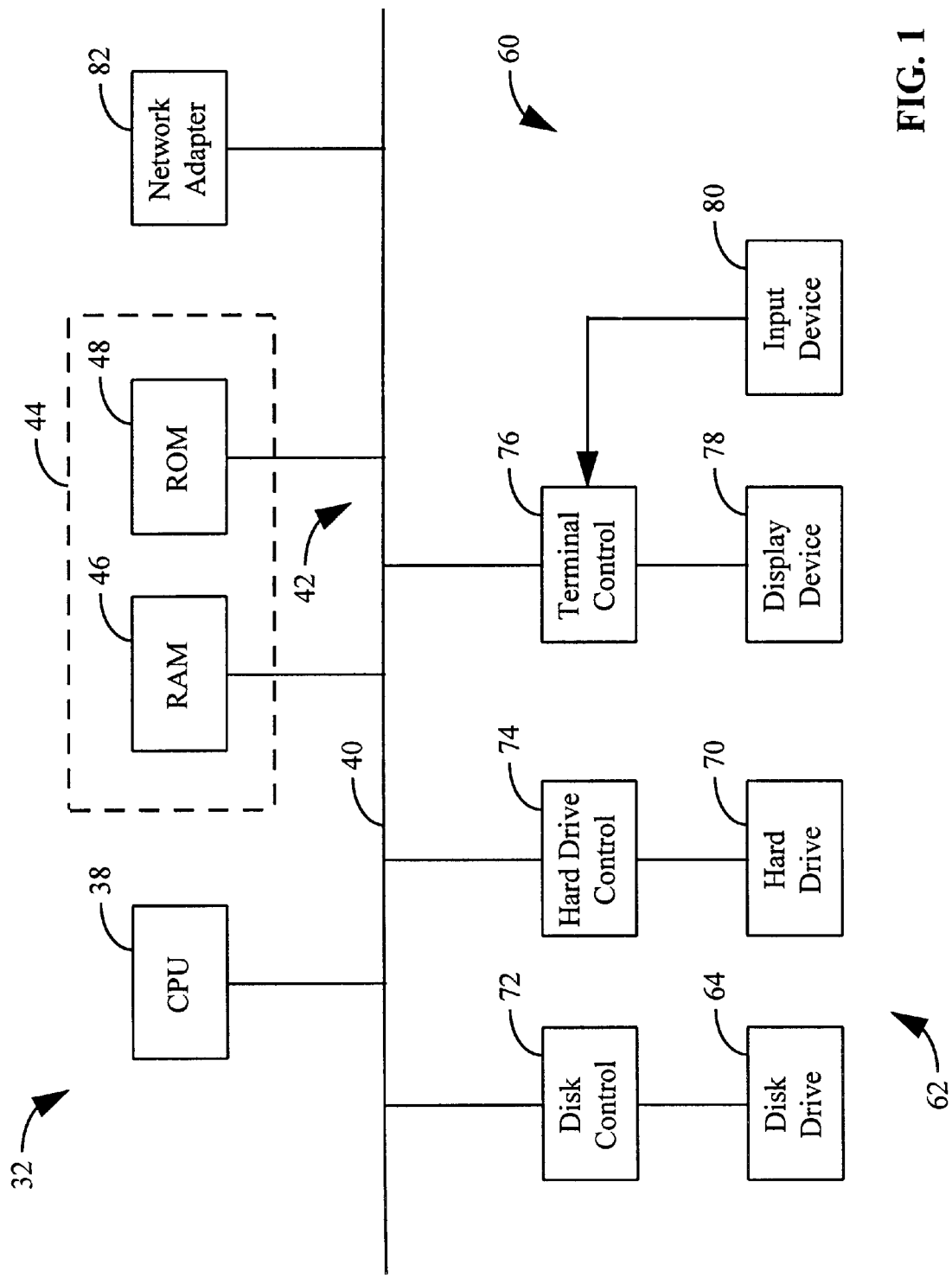
FIG. 1 is a block diagram of a computer system in accordance with the present invention.

The present invention will now be described with reference to the drawings, wherein like reference numerals are used to refer to like elements throughout.

As is mentioned above, the present invention relates to a system and method for creating and updating data files and references 30 of a computer and/or system 32 so that an information providing program 34 (FIG. 3) stored thereon will include the newest information available. The present invention provides a set of reference data files 30 (FIG. 3) on a recording medium 36 (FIG. 15) such as a floppy disk or a CD-ROM that is being used to install the program 34, files or other data to a computer 32 or computer system 32. Along with the program 34 or data being installed, the updated reference data files 30 are also provided to the computer 32 or computer system 32. The reference data files 30 being downloaded include the most recently available data references. The computer 32 or computer system 32 receiving the files creates a subset of reference data files 30 to be configured, queried, browsed, selected, reported, archived, ordered, or hyperlinked. Thus, according to the present invention, the computer system's 32 information reference data files 30 are automatically updated with the installation of new data and/or programs.

Referring initially to FIG. 1, a detailed block diagram of the computer system 32 is shown in accordance with the present invention. The computer system 32 includes a central processing unit (CPU) 38 which is coupled to a bus 40. The CPU 38 or processor can be any of a plurality of processors, such as the 486DX/33, 486DX2/66, 486DX4/50-100, 486DX4/33-100, 486DX4/33-83, p24T, Pentium 50/75, Pentium 60/90, Pentium 66/100, and Pentium II, and other similar and compatible processors. The processor 38 functions to perform various operations described herein as well as for carrying out other operations related to the system. The manner in which the processor can be programmed to carry out the functions relating to the present invention will be readily apparent to those having ordinary skill in the art based on the description provided herein.

The bus 40 includes a plurality of signal lines 42 for conveying addresses, data and controls between the CPU 38 and a number of other system bus 40 components. The other system bus 40 components include a memory 44 (including a Random Access Memory (RAM) 46 and a Read Only Memory (ROM) 48) and a plurality of Input/Output (I/O) devices 60. The memory 44 serves as data storage and may store appropriate operating code to be executed by the processor for carrying out the functions described herein.

The RAM 46 provides program instruction storage and working memory for the CPU 38. The ROM 48 contains software instructions known as the Basic Input/Output System (BIOS) for performing interface operations with the I/O devices 60. Also stored in the ROM 48 is a software routine which operates to load a boot program from the booting device. The boot program will typically be executed when the computer system 32 is powered on or when initialization of the system 32 is needed.

The I/O devices 60 include basic devices such as data storage devices 62 (e.g., floppy disks 64, tape drives, CD-ROMs, hard disks 70, etc.). Typically, the I/O devices 60 communicate with the CPU 38 by generating interrupts. The CPU 38 distinguishes interrupts from among the I/O devices 60 through individual interrupt codes assigned thereto. Responses of the CPU 38 to the I/O device 60 interrupts differ, depending, among other things, on the devices generating the interrupts. Interrupt vectors are provided to direct the CPU 38 to different interrupt handling routines.

The interrupt vectors are generated during initialization (i.e., boot up) of the computer system 32 by execution of the BIOS. Because responses of the CPU 38 to device interrupts may need to be changed from time to time, the interrupt vectors may need to be modified from time to time in order to direct the CPU 38 to different interrupt handling routines. To allow for modification of the interrupt vectors, they are stored in the RAM 46 during operation of the computer system 32.

A disk control subsystem 72 bidirectionally couples one or more disk drives (e.g., floppy disk drives, CD-ROM drives, etc.) to the system bus 40. The disk drive works in conjunction with a removable storage medium 62 such as a floppy diskette 64 or CD-ROM.

A hard drive control subsystem 74 bidirectionally couples a rotating fixed disk, or hard drive 70 to the system bus 40. The hard drive control subsystem 74 and hard drive 70 provide mass storage 62 for CPU 38 instructions and data.

A terminal control subsystem 76 is also coupled to the bus 40 and provides output to a display device 78, typically a CRT monitor, and receives inputs from a manual 80 device such as a keyboard. Manual input may also be provided from a pointing device such as a mouse.

A network adapter 82 is provided for coupling the system to a network.

The components illustrated in FIG. 1 may be embodied in a personal computer, a portable computer, a workstation, a minicomputer, a main frame computer, or a super computer. As such, the details of the physical aspect of the data processing system such as structure of the bus 40 or the number of CPUs 38 that are coupled to the bus 40, is not crucial to the operation of the invention and thus is not described in further detail below.

Figure 2:
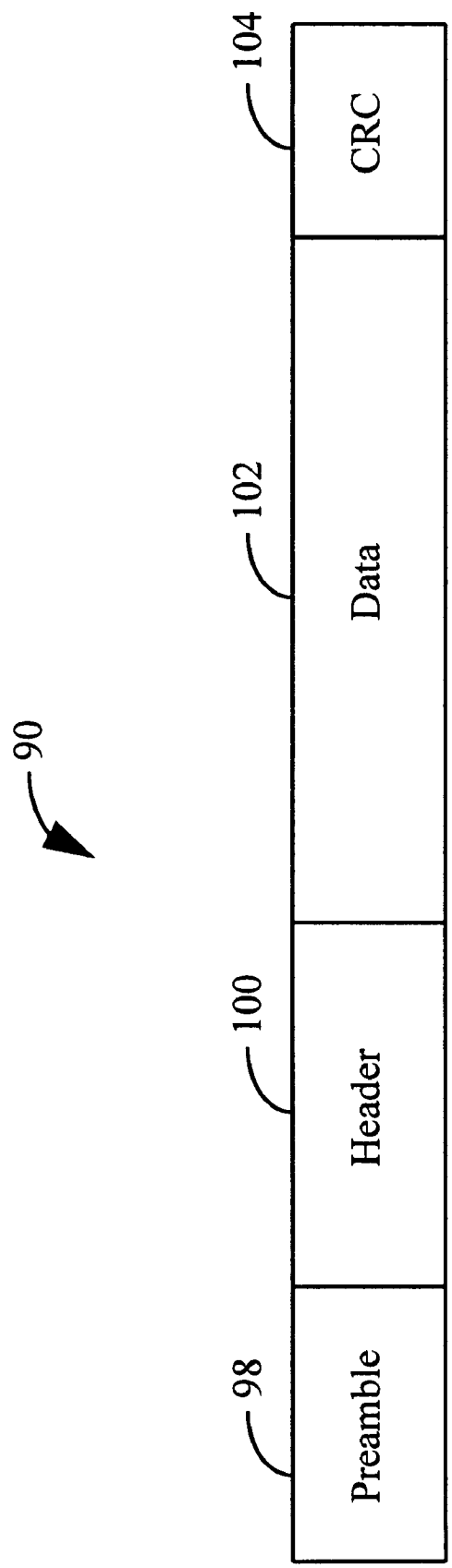
FIG. 2 is a schematic representation of a packet format in accordance with the present invention.

FIG. 2 shows the format of an exemplary data packet 90 received by the transceiver 92 (FIG. 4). In order to ensure proper routing of messages between the information provider 94 and an intended receiver 96, the messages are initially broken up into data packets 90, each of which receive a destination address according to a consistent protocol, and which are reassembled upon receipt by the target computer 32. The exchange of information between endpoints in a packet network is achieved via a "protocol." A commonly accepted protocol for this purpose is the Internet Protocol (IP), which provides for networking. Used in conjunction with the IP may be a Transmission Control Protocol (TCP) which provides for a reliable stream delivery of messages or a User Datagram Protocol (UDP) which allows for distinguishing messages among multiple destinations with a given host computer 32.

More specifically, the TCP protocol is a popular connection-oriented transport layer protocol that is used around the world. The TCP protocol offers a full duplex reliable virtual end-to-end connection for transporting information between endpoints by using one or more of the packets 90, each of which comprises both control information and data.

As is conventional, the data packet 90 is represented by a sequence of data and/or control information which is segmented into respective fields. The data packet 90 together with the information contained therein is constructed by the device which subsequently transmits the packet 90 to the transceiver 92. The format of the data packet 90 will typically be governed by the system protocol as is conventional. The data packet 90 includes, in order, a synchronization field 98 (i.e., preamble) including synchronizing bits for synchronizing the receiver; a header field 100 including header information such as the source address of the data packet 90, the header field 100 including at the end thereof a length field including information regarding the length of the packet 90 (e.g., number of bits); a type/address field; a data field 102; and a cyclic redundancy check (CRC) field 104. It is noted that the length of the respective fields as shown in FIG. 2 as well as the other figures herein is not necessarily shown in proper corresponding proportion. In many cases the length of some fields has been exaggerated in the drawings for ease of understanding. Furthermore, it is also noted that the synchronization field may be transmitted at a data rate different from that of the remaining packet 90, as is well known throughout the art.

The type/address field includes the destination address of the packet 90 and information indicating whether or not the packet 90 is of a type which requires a response. For example, the type/address field can include one or more bits which are set to indicate that the transceiver 92 is required to transmit a positive and/or negative acknowledgment of receipt of the packet 90. In addition, or in the alternative, the type/address field can include information which identifies the packet 90 as a type which needs to be processed and transmitted by the transceiver 92 in order to forward the information to another location. Regardless of the particular reason why the packet 90 may necessitate a response, the type/address field has one or more predetermined indicia therein for indicating whether the packet 90 is of a type which requires that the transceiver 92 respond by transmitting information or is of a type which does not require that the transceiver 92 respond by transmitting information. The type/address field is shown located approximately in the middle of the data packet 90, although it will be appreciated that the type/address field could be located elsewhere in the packet 90. In the preferred aspect, however, the type/address field is located within the initial half of the data packet 90 and most preferably towards the front of the packet 90.

Following the type/address field, the data packet 90 includes a data field 102 which contains the primary data being sent within the packet 90. The data field 102 is then followed by a cyclic redundancy check (CRC) field 104 which includes a CRC code for error detection as is conventional.

Figure 3:
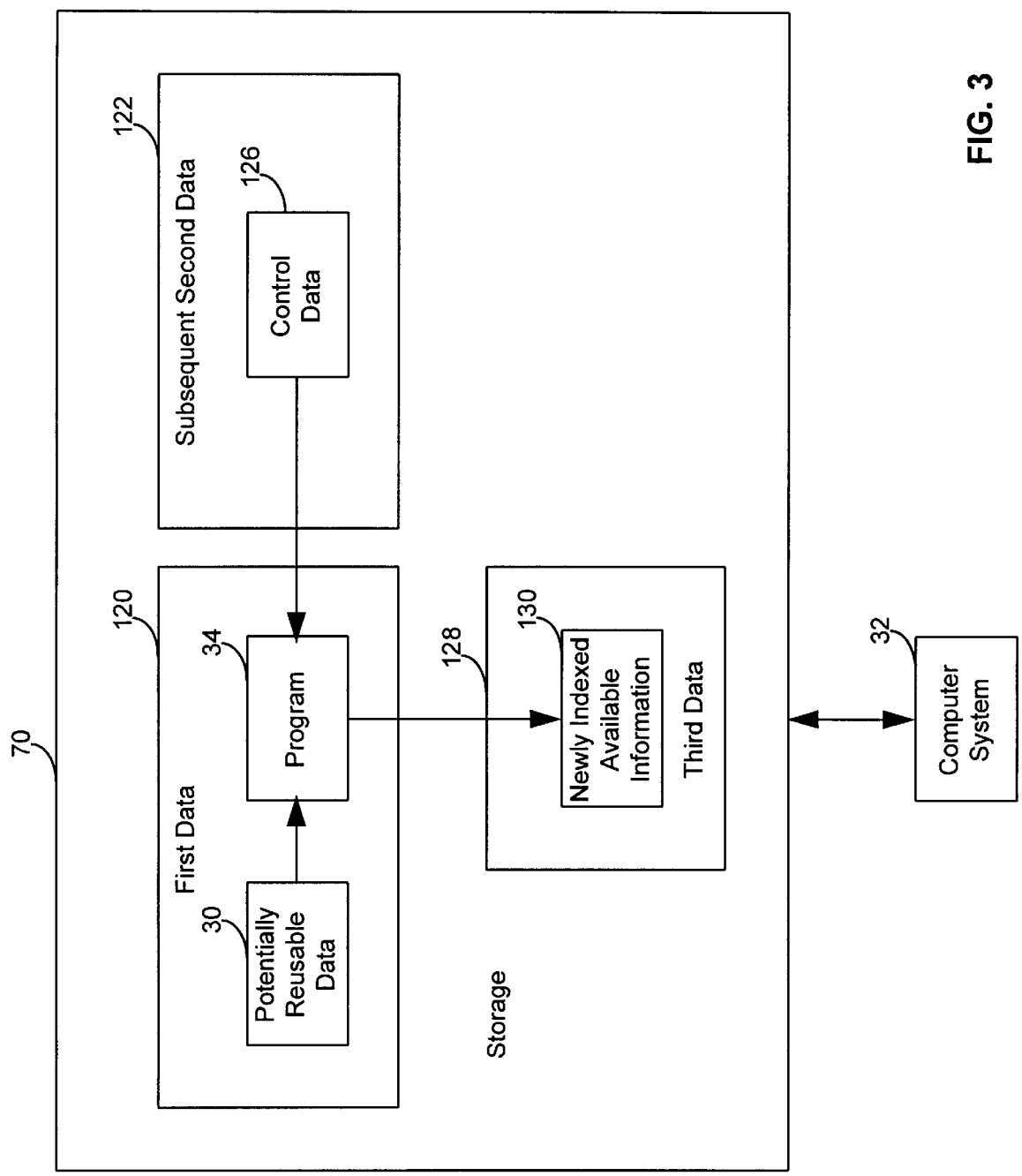
FIG. 3 is a block diagram showing the relationships of the storage of first, second, and third data on a computer system in accordance with the present invention.

Referring now to FIG. 3, a first data 120 including the program 34 and potentially reusable data 30 is stored on the storage medium 70 of the computer system 32. In turn, a second data 122 including control data 126 is subsequently stored on the same or associated storage medium 70 as the first data 120. The contents of the control data 126 is unknown at the time the first data 120 was stored. The control data 126 corresponds to a subset of the potentially reusable data 30. The program 34 is executed and combines the control data 126 and the potentially reusable data 30 to create on the storage medium 70 of the computer system 32 a third data 128 including newly indexed available information 130.

Figure 4A:
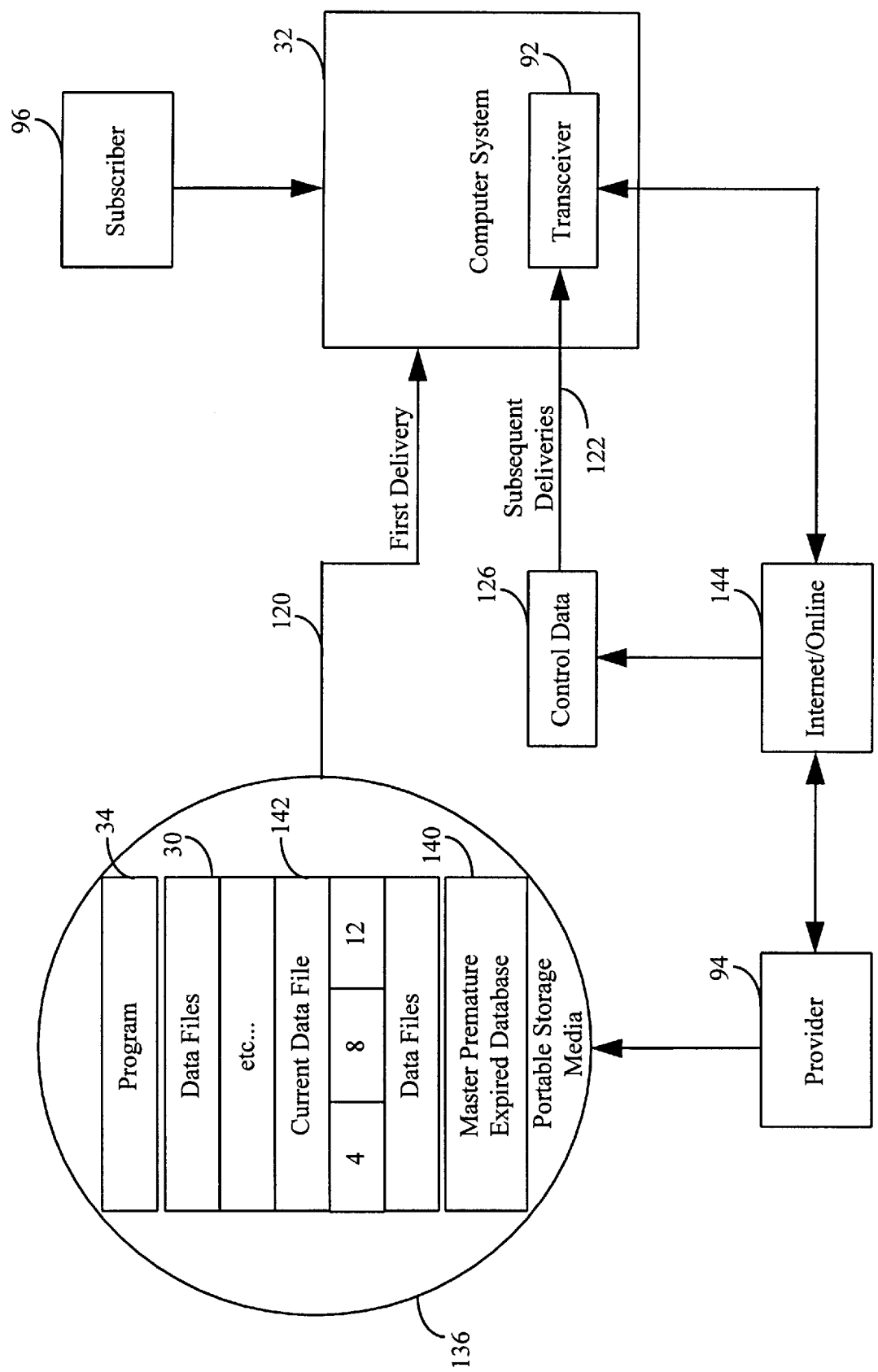
FIG. 4a is a block diagram of a computer system and method of delivery for a given subscription period in accordance with the present invention.

Turning now to a more detailed consideration of a preferred aspect of the present invention, FIG. 4a illustrates a first delivery of data 120 which is sent to the subscriber 96 from a provider 94 via the portable storage media 136, or sent via any other forms of transmission. The delivery contains the following: a master premature expired patent database 140, a program 34 that allows a subscriber 96 to configure, query, browse, select, report, archive, order, or hyperlink from the master premature expired patent database 140 or from future databases that can be remotely built by the program 34, and data files 30 of patent information that have the potential to prematurely expire after four, eight, or twelve years from the issue date of the patent. Subsequent deliveries 122 of control data 126 are periodically sent to the subscriber 96 via e-mail or other forms of transmission where the content of such data is unknown at the time of the first delivery. The control data 126 represents information that corresponds to a subset of records from the current data file 142. At this point, the subscriber 96 can operate the computer system 32 and run the program 34 to either combine a current data file 142 with the control data 126 or to configure, query, browse, select, report, archive, order, or hyperlink from the master premature expired database 140 and connect to the Internet 144 or other on-line services via the transceiver 92 of the computer system 32 to view a selected document image and send order or other information to the provider 94. The first 120 and subsequent deliveries 122 of FIG. 4a represent information sent during a given subscription period. A subscription period is the time it takes to send a new first delivery 120 of information. For instance, if a portable storage media 136 is updated and sent quarterly, the subscription period is three months. More than three months of data files 30 of patent information that have the potential to prematurely expire are placed on the portable storage media 136 so there is no lapse in coverage for creating indexed databases of newly available information 130 while the portable storage media 136 for the next subscription period is being sent.

Figure 4B:
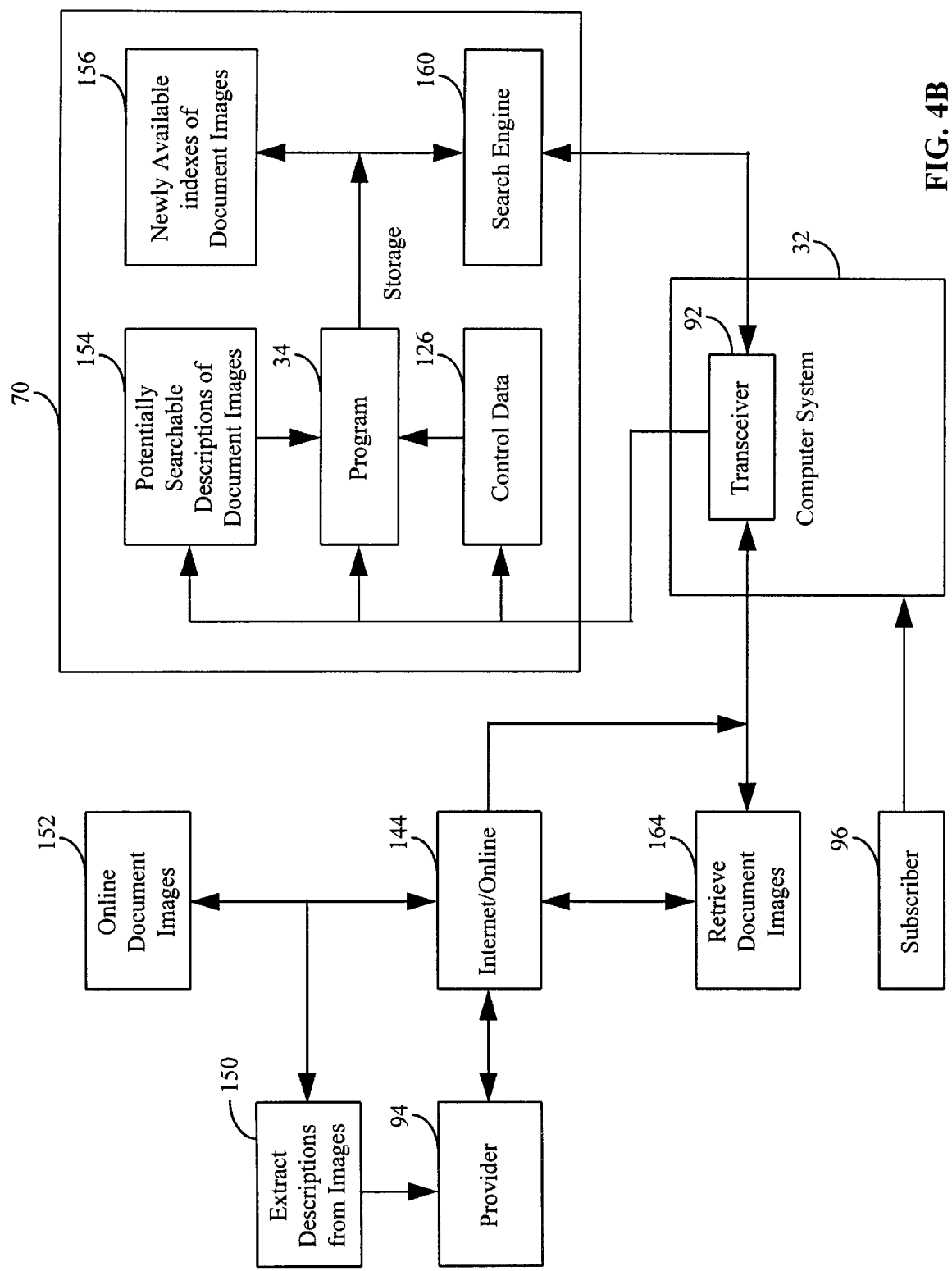
FIG. 4b is a flowchart showing how on-line document images can be searched and retrieved in accordance with the present invention.

Turning now to FIG. 4b, a flowchart shows how off-line indexes are created to be used for retrieving on-line document images. A provider 94 extracts text descriptions 150 of on-line document images 152 from the Internet 144 to be prepared for delivery. A first delivery 120 is sent to the storage 70 of a subscriber's 96 computer system 32 via the transceiver 92 which includes a program 34 and data files of potentially searchable descriptions of document images 154. The program 34 receives via the transceiver 92 a subsequent delivery 122 of control data 126 which combines with the potentially searchable descriptions 154 to form indexes 156 of the location information of the on-line document images 152 and indexes 156 of the searchable descriptions 154 of the document images 152. The subscriber 96 uses the search engine 160 from the program 34 to search and select for desirable document descriptions 154. To retrieve an on-line document 152, a subscriber 96 uses the search engine 160 to use the indexes of document location information 156 and retrieve document images 164 from the Internet 144 via the transceiver 92 of the computer system 32.

Figure 5:
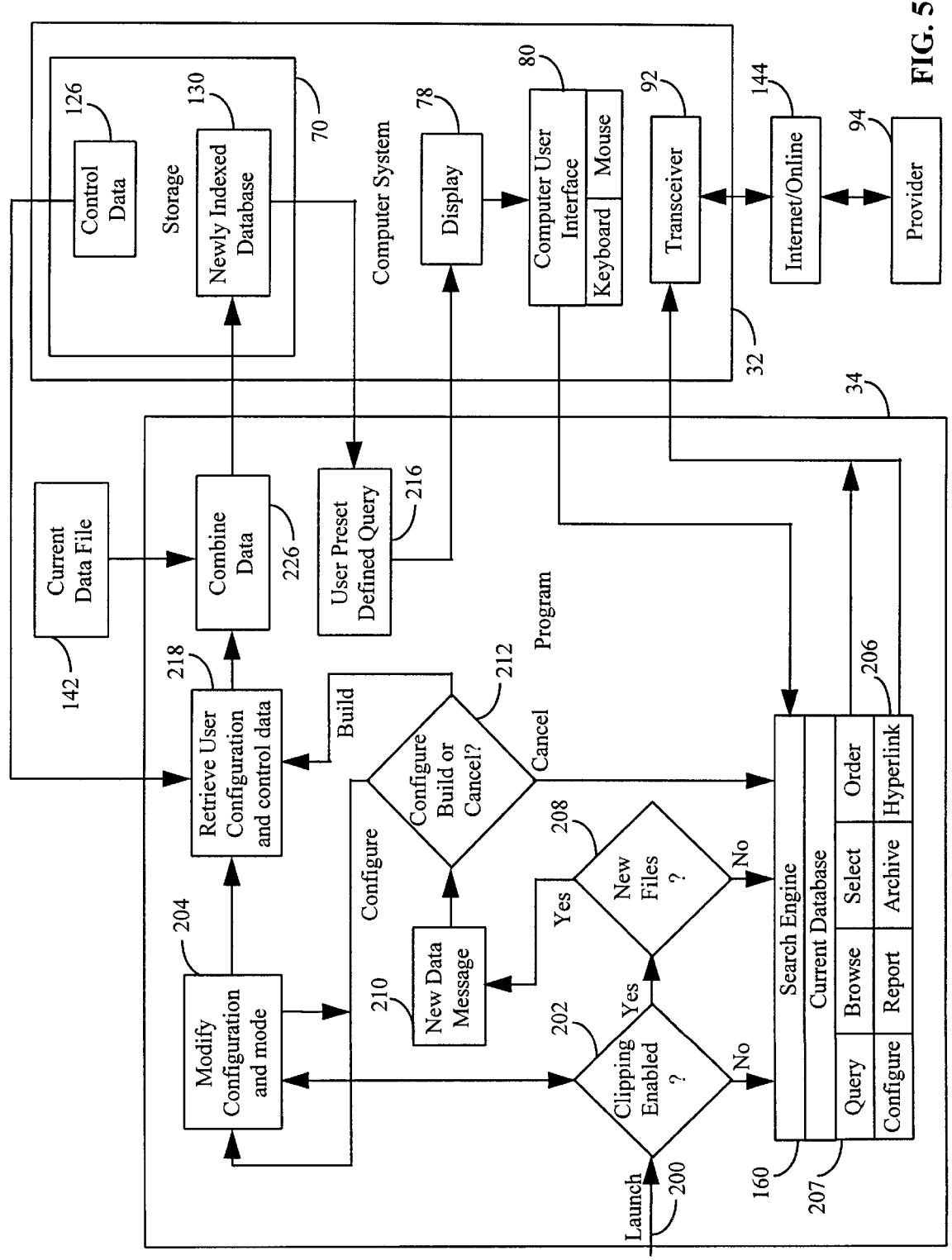
FIG. 5 is a system flow chart of the program, new data formation and usage illustrating one particular aspect of the present invention.

Turning now to FIG. 5, a flowchart that represents the general operations of the present invention and the relationship between the subscriber 96, the executable program 34 and the computer system 32 is shown. Set out below is an illustration of the update program 34 for applying modifications or updates to the reference data files 30 of the system 32. The update program 34 is in program design language from which source code and machine code are derivable. In the following general description of the update program 34, it is to be assumed that system is under mouse and keyboard device control. Moreover, it is assumed that the update program 34 is invoked from a driver program contained in the operating system which facilitates the display of all of the screen panels, the monitoring of the keyboard and the installation of the plurality of separately installable features or components of the software program.

When the subscriber 96 launches 200 the program 34, the status of the automated clipping service 202 is determined by retrieving configuration 204 information to determine if the clipping mode is enabled 202 and if the clipping mode 204 is automated. If the clipping mode is disabled, the program 34 will enter the search engine 160 allowing the subscriber 96 to configure, query, browse, select, report, archive, order, or hyperlink 206 from the current database 207. When the clipping mode 202 is enabled and there are no control files available 208, the program 34 will enter the search engine 160. However, when there are new control files expected to be available 208 or there are old control files available 208, a message 210 is displayed stating that newly available information 130 is waiting to be built. Along with this message 210, there are three choices 212 for the subscriber 96 to select from. The first choice 212 allows the subscriber 96 to configure two parameters 204 in order to automate the clipping service 202. These parameters are the default data path to find the most recent control data 126 available, and the filename and data path to find the user preset defined query 216 that filters the newly available information to be built. The second choice 212 allows the subscriber 96 to cancel the message 212. By doing so, the program 34 will enter the search engine 160. The third choice 212 allows the subscriber 96 to build and view the newly available information 130. When this selection is made, the user configuration 204 information is retrieved 218 and the program 34 combines 226 the new control data 126 with the corresponding current file 142 of potentially reusable data 30 and builds an indexed database of newly available information 130 in storage 70. The program 34 will then filter the newly created indexed database 130 with a user-defined preset query 216 and send the information of interest to be displayed 78. If the clipping mode 204 is automated, then the above choices and messages are bypassed, and subscriber 96 preferences are retrieved from configuration 204 to determine what new information is filtered 216 or 'automatically clipped' and sent to the display 78.

From this point, the subscriber 96 can operate a computer user interface 80 (such as a keyboard, mouse, etc.) to configure, query, browse, select, report, archive, order, or hyperlink 206 from the search engine 160 and connect to the Internet 144 or other on-line services via the transceiver 92 of the computer system 32 to view a selected document image and send order 206 or other information to the provider 94 for further document delivery.

Figure 6:
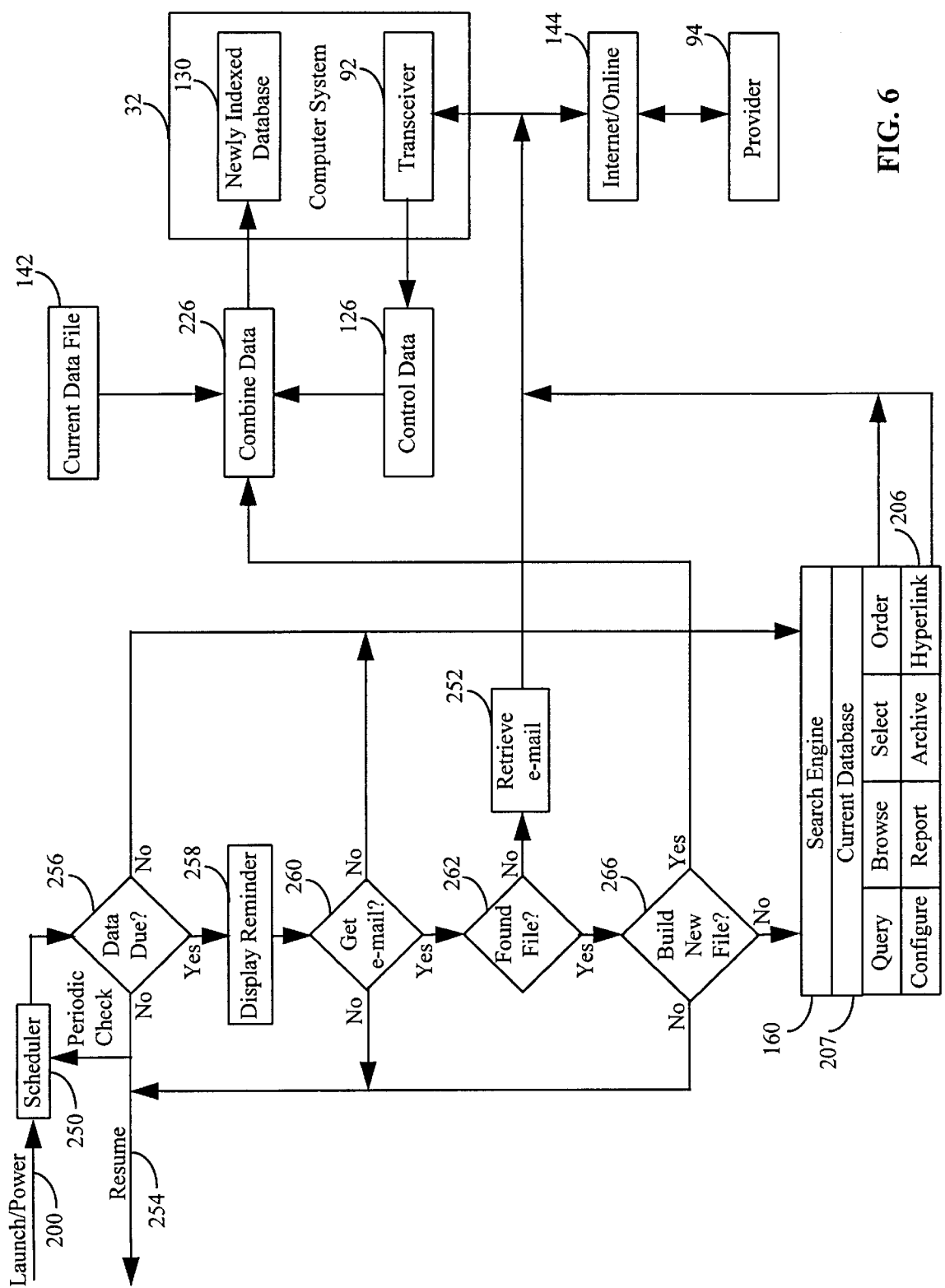
FIG. 6 is an alternative aspect of the present invention that illustrates scheduling and data retrieval in accordance with the present invention.

In an alternative aspect of the present invention, FIG. 6 illustrates how a scheduler 250 and e-mail retrieval system 252 can be integrated into the invention. First, when the computer system is powered up, the operating system is loaded and activates a scheduler 250 to periodically check the system time in comparison to the next scheduled delivery of control data 126. Computing activity is resumed 254 until the current system time exceeds the scheduled delivery time. In the event where the subscriber 96 launches 200 the program 34 and the control data 126 is not due 256, the program 34 will enter the search engine 160 allowing the subscriber 96 to configure, query, browse, select, report, archive, order, or hyperlink 206 from the current database 207. In either case, when the control data is due 256, a message 258 is displayed 78 to remind the subscriber 96 that the control data 126 is overdue and asks if the subscriber 96 would like to obtain the latest e-mail 260. If the control data is not due 256, depending upon which case, the computing activity is either resumed 254 by default, or the program 34 will enter the search engine 160. If the subscriber 96 would like to obtain the latest e-mail 260, the program 34 then checks for new control data 126 by searching for the control data file 126 in a default data path. If no data is found 262, an e-mail retrieval 252 procedure is launched to obtain the new control data 126 via the transceiver 92. Upon receipt of the control data 126 or when the data is found 262, a message 266 is displayed 78 that asks if the subscriber 96 would like the potentially reusable data 30 to be built and displayed 78. If not, depending upon which case, the computing activity is once again either resumed 254 by default, or the program 34 will enter the search engine 160. If so, the program 34 combines 226 the new control data 126 with the corresponding current file 142 of potentially reusable data 30 and build an indexed database of newly available information 130 as requested by the subscriber 96.

Figure 7A:
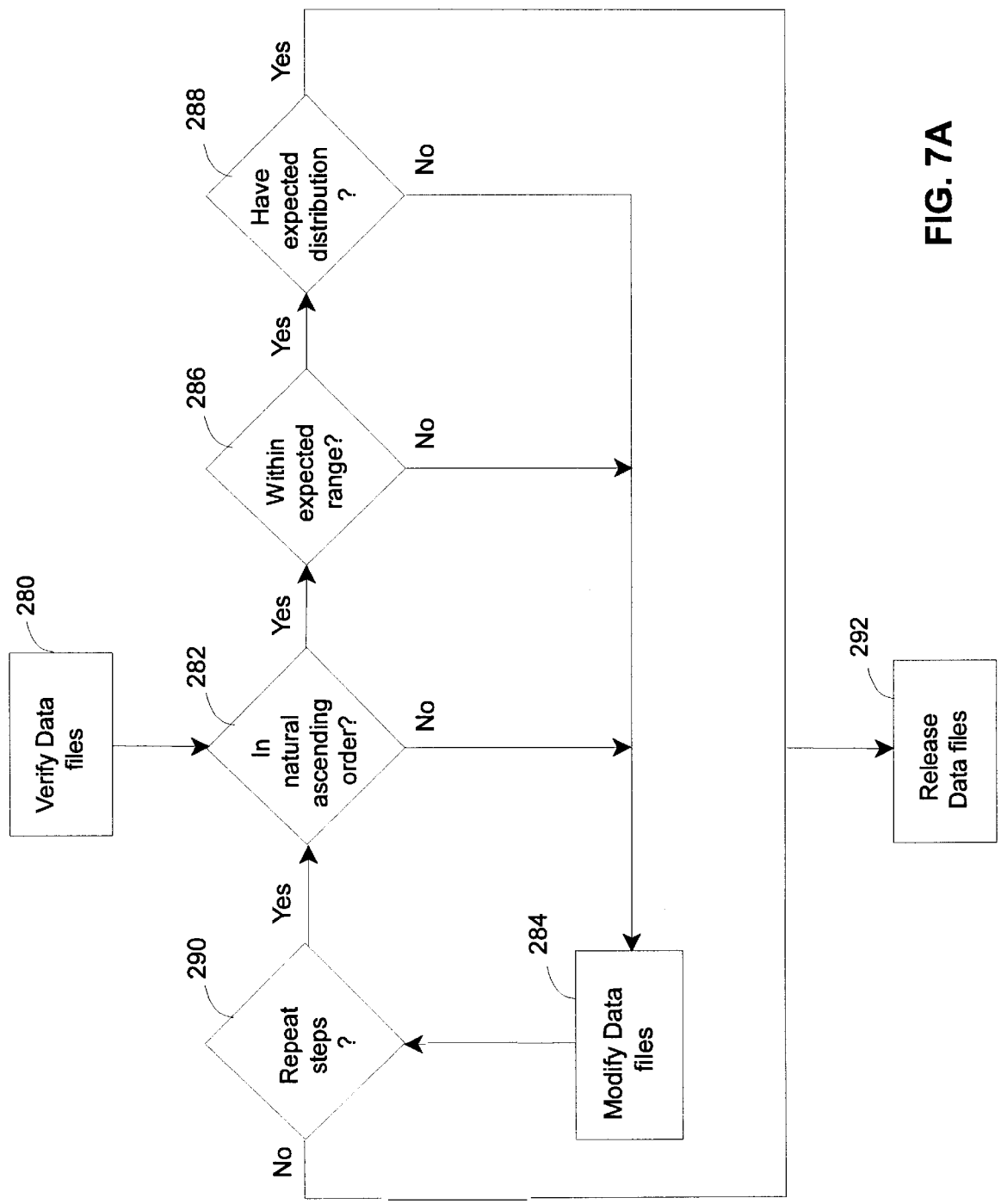
FIG. 7a is a flow chart of verification methods to assure quality and accuracy of newly released premature expired information in accordance with the present invention.

Referring now to FIG. 7a, steps are shown for verifying 280 either newly released or soon to be released expired patent data. The patent numbers are checked for digit reversals of patent numbers intended to be published in ascending order 282. By comparing each record of a database so that the patent number of the current record is always smaller than the patent number of the next record of the database, all records that do not meet this test are flagged to be modified 284. Since it is known in advance which patents could potentially expire early in a given week, all patent numbers to be verified should fall within an expected range of patent numbers 286. By comparing all patent numbers for their existence in a lookup table (see Table 7b) of expected ranges in a given week, patent numbers that do not meet this comparison are flagged to be modified 284. Periodically, the master list of the nearly 300,000 patent numbers currently expired is checked for omissions at different expiration levels. Variances are established by checking for the total number of patents expiring early in a current week and subtracting the total number of early expirations of the previous week. The variance is checked for all weeks, and variances that exceed an accepted level are flagged to be modified 284. After modifications, the tests can be repeated 290 or if accepted, the new data is successfully verified and ready for release 292.

Figure 8:
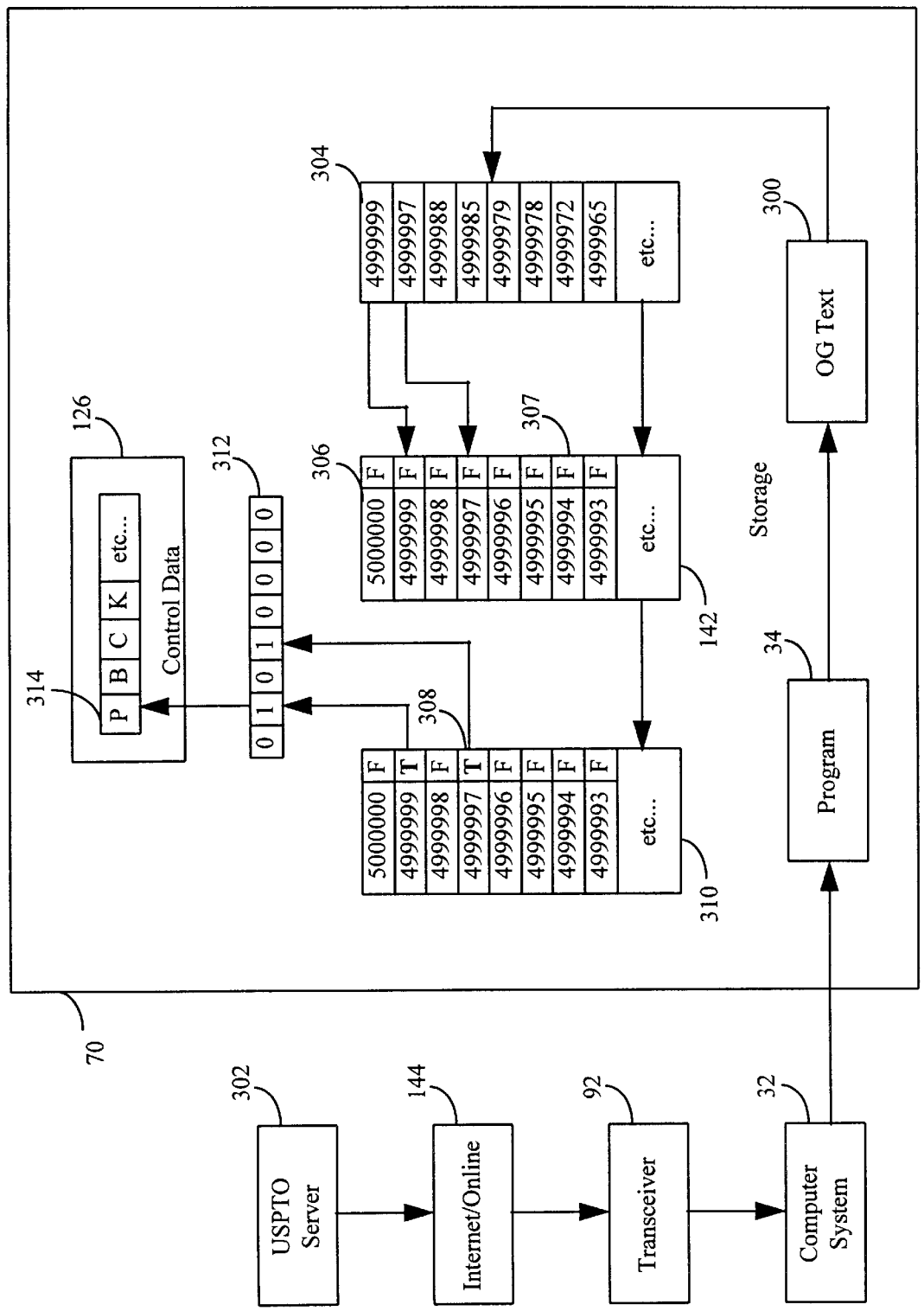
FIG. 8 is a flow chart of the steps taken to create and encode control data from a current set of reference data updates in accordance with the present invention.

Turning now to FIG. 8, the control data 126 is created for a subsequent delivery 122. The release of the current OG Notice 300 is received from the USPTO server 302 on the Internet 144 via the transceiver 92 of the computer system 32. A program 34 is executed and a temporary database 304 of patent numbers is created and indexed by extracting the premature expired patent numbers from the text file of the OG Notice 300. A relation is set into the temporary database 304 from a current data file 142 which is identical to the subscriber's current file 142 of potentially reusable data 30. By default, all of the records have a logical value of FALSE 307 in the expired field 306. The expired field 306 of the current data file 142 is modified to a logical value of TRUE 308 for all matching records of this relation. Starting from the first record of the modified 310 current data file in batches of eight records at a time, an eight bit string composed of 1's and 0's is formed 312 where the logical value of TRUE 308 in the expired field 306 for a given record is represented by a 1. The eight bit string is converted into an equivalent binary value. The binary value is then further converted into its equivalent ASCII character 314. A string of ASCII characters 314 are formed by repeating the steps of encoding the data until the end of the modified 310 current data file is reached. The resultant encoded character string becomes the newly created control data 126.

Figure 9:
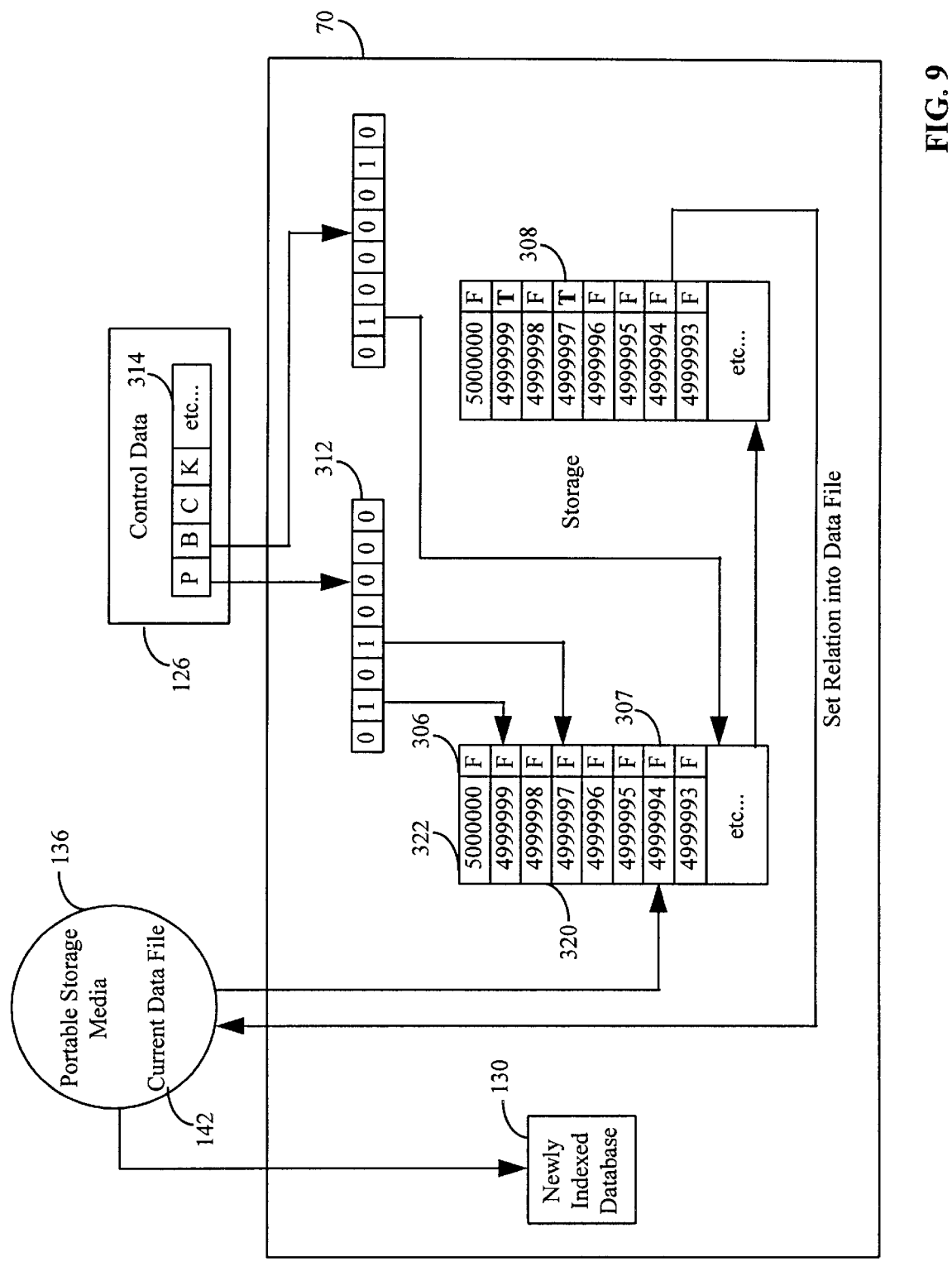
FIG. 9 is a flow chart of the steps taken to decode control data and create an indexed database of newly available information in accordance with the present invention.

Referring now to FIG. 9, steps are taken to combine the control data 126 with the current file 142 of potentially reusable data 30 in order to create an indexed database of newly available information 130. First, a temporary file 320 is created in storage 70 by copying the patent number field 322 and expired field 306 only, from all of the records in the current data file 142 located on the portable storage media 136. By default, all of the records have a logical value of FALSE 307 in the expired field 306. The control data 126 is composed of ASCII characters 314 which represent what records to modify in the expired field 306 of the temporary file 320. The control data 126 is decoded by converting each ASCII character 314 to an equivalent binary value. The binary value is then further converted into an eight bit string 312 composed of only 1's and 0's that represents the binary value. Starting from the first record of the temporary file 320 and the first character 314 of the control data 126, the expired field 306 of the temporary file 320 is modified to a logical value of TRUE 308 for all records where the record position of the temporary file 320 equals the character position of the 1's in the decoded character string 312. The steps of decoding and modification are continued until the end of the control data file 126 is reached. A relation is then set from the temporary file 320 to flag the newly available information 130 from the current file 142 of potential reusable data 30 on the portable storage media 136. The flagged records are then copied and indexed to storage 70 to form an indexed database of newly available information 130.

Although it is unknown which patents will prematurely expire each week, the total number of patents previously issued that have the potential to expire early in a given week is known. By assigning a status bit to each of the patents that can potentially expire early, then dividing the total by eight and rounding, the maximum minimized transmission size of the delivery in bytes can be calculated in advance for any given week. The table in FIG. 10a shows the projected delivery sizes of the control data for the second half of the year 1996. The four, eight, and twelve year columns represent the number of patents previously issued that have the potential to expire early in a given week. The last four columns in the table show modified values due to previous premature expirations that can reduce the size of the delivery of control data by about 15%. Patents issued eight years ago have already had premature expirations four years ago, and patents issued twelve years ago have already had premature expirations four and eight years ago.

Figure 10B:
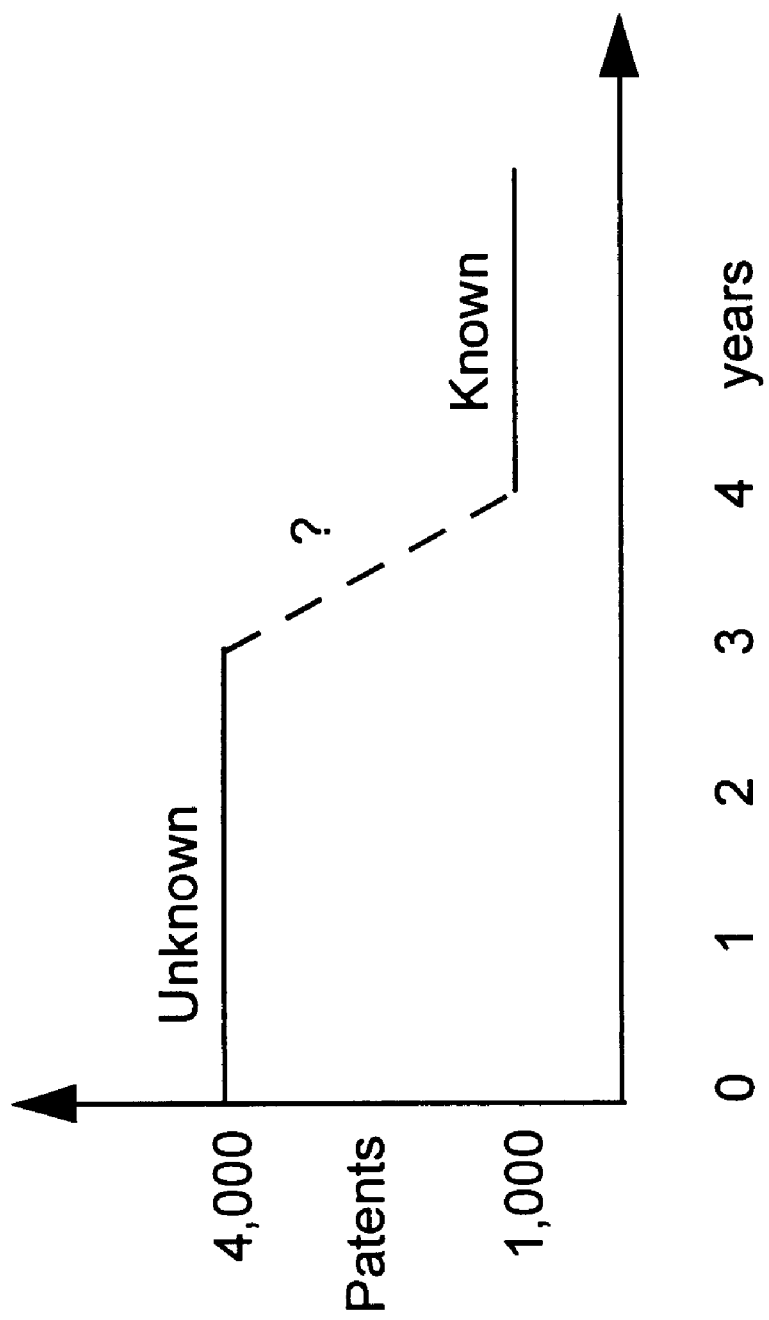
FIG. 10b is a graph showing the change in the potential of premature expiration in accordance with the present invention.

There is a way to further reduce the maximum minimized transmission size of the delivery of control data and reduce the storage size of the potentially reusable data per week allowing more weeks to be sent in advance, thereby increasing the subscription period of the disc. The potential for a patent to prematurely expire is created at the time of issuance, and in turn, that potential is removed upon a patent's premature expiration. For example, the graph in FIG. 10b shows that there are about 4,000 patents that have the potential to expire early, and of those, only about 1,000 patents actually do expire early in a given week. The number of patents that actually lapse for a given week is unknown, and thus creating the potential. The fact that a potential was created and then later removed shows not only the existence of potential, but also a change in potential. The fact that maintenance fees can not be paid earlier than one year before the premature expiration of the patent means that the potential for the patent to expire early does not change for the first three years of the expiration cycle. For the case of patents, the expiration cycle is four years. For trademarks, the expiration cycle is ten years. It is to be appreciated that the present invention may be applied to trademarks in an analogous manner as mentioned above with respect to patents.

From the above example, it is gathered that the maintenance fees of about 3,000 patents have been paid during the last year of the expiration cycle. As fees are paid, there are less patents that have the potential to expire early, thereby creating more space on a portable storage media resulting in the possibility for a longer subscription period. For example, if renewal fees are paid linearly, then there is a total of near 60 renewals for each week. A portable storage media can be delivered, where the first data file includes next week's potential premature expirations of about 1,060 patents. The following week would have about 1,120 patents and so forth. At this rate, 50 weeks of potentially reusable data would total to about 126,500 patents. Without immediate access to renewal information, the potential number of patents to expire early per week can not be reduced. In light of this, by dividing the 126,500 patents by the 4,000 patents that have the potential to expire early in a given week, only 31 complete weeks of information can be stored in the same space as the 50 weeks, thereby increasing the subscription period by 60%. As shown, by using renewal information, the minimum of potential expirations can drop to as low as about 1,060 patents. Dividing by 8 and rounding, the minimum minimized transmission size of the delivery can be calculated to about 133 bytes, thereby further reducing the on-line transmission size by as much as an additional 74%.

The benefits of an increased subscription period becomes critical when applying this application particularly to the search and retrieval of patent document images on Digital Versatile Disc (DVD-ROM). A single layer, single sided DVD-ROM has a maximum storage capacity of about 4.7 GB, and is seven times greater than the storage capacity of CD-ROM which is about 650 MB. Currently, about 1,000 searchable patent document images can fit on CD-ROM, and in turn, roughly 7,000 patents can be placed on DVD-ROM. By placing 4,000 patents per week on disc, as stated from the above example, only one week of patent document images that have the potential to expire early can fit on DVD-ROM. However, if there is access to renewal information, a full six weeks of patent document images that have the potential to expire early can be stored in advance, thereby increasing the subscription period by 600%. This DVD-ROM application serves further utility because it removes the need for on-line document retrieval. By streamlining the document delivery process, the subscriber 96 is saved the cost and time of on-line document ordering, and allows for complete privacy of unlimited off-line searching, retrieval, and reporting of premature expired patent documents.

While a patent is in effect, the utility to the public is the knowledge gained from the disclosure of the invention. When a patent expires, the utility to the public changes, allowing anyone to practice or use the knowledge gained from the patent by 'making, using, or selling the invention.' There is in turn an on-line implementation for reducing the search and retrieval time of premature expired patent documents. As shown, the premature expiration of a patent is seen, if at all, as a status or subset of all patents. As a result, all search requests for premature expirations, if any, are searched in relation to a database of all patents. Because the utility to the public of premature expired patent information changes, the arrangement of premature expired data can offer new use when searched. The premature expired information is partitioned and arranged as a new set of data (as opposed to its previous subset or status) and its resultant search time becomes significantly reduced. This new compilation restores the temporal displacement of information resulting from the potential of multiple premature expirations. Applying a search and retrieval system to this new compilation gives the user reduced storage and increased access speed by over 70% regardless of where the compilation resides.

The primary goal of information dissemination of public information is to increase the potential of its accessibility to the public. This is accomplished by reducing distribution costs and creating incentives for the ease of retrieval which has been previously shown. Currently, the premature expiration status of a patent can be searched on the CASSIS-BIB disc or searched via a dedicated on-line connection to a select few commercial data vendors at most. There have been patent servers in existence on the Internet for more than two years offering up to 27 different fields for selective searching of patent information. However, there are no patent servers of any kind on the Internet that allow for the specific search of premature expired patent information.

Because patent examiners have had no immediate use for premature expired information, the APS data available to commercial data vendors and the public has never been designed to be reconciled with future premature expirations. Furthermore, commercial data vendors have been motivated by the profits of existing niche markets, and in turn, have had no immediate need or basis to solve the problem of facilitating access of premature expired patents or trademarks to the public at large. Even though compiled or partitioned arrangement of premature expired patent information is the best way to search for it, as of yet there is no evidence or intention by anyone or any entity to facilitate searching on the Internet for premature expired patent information regardless of whether the arrangement of premature expired patent information is compiled or not.

Figure 11:
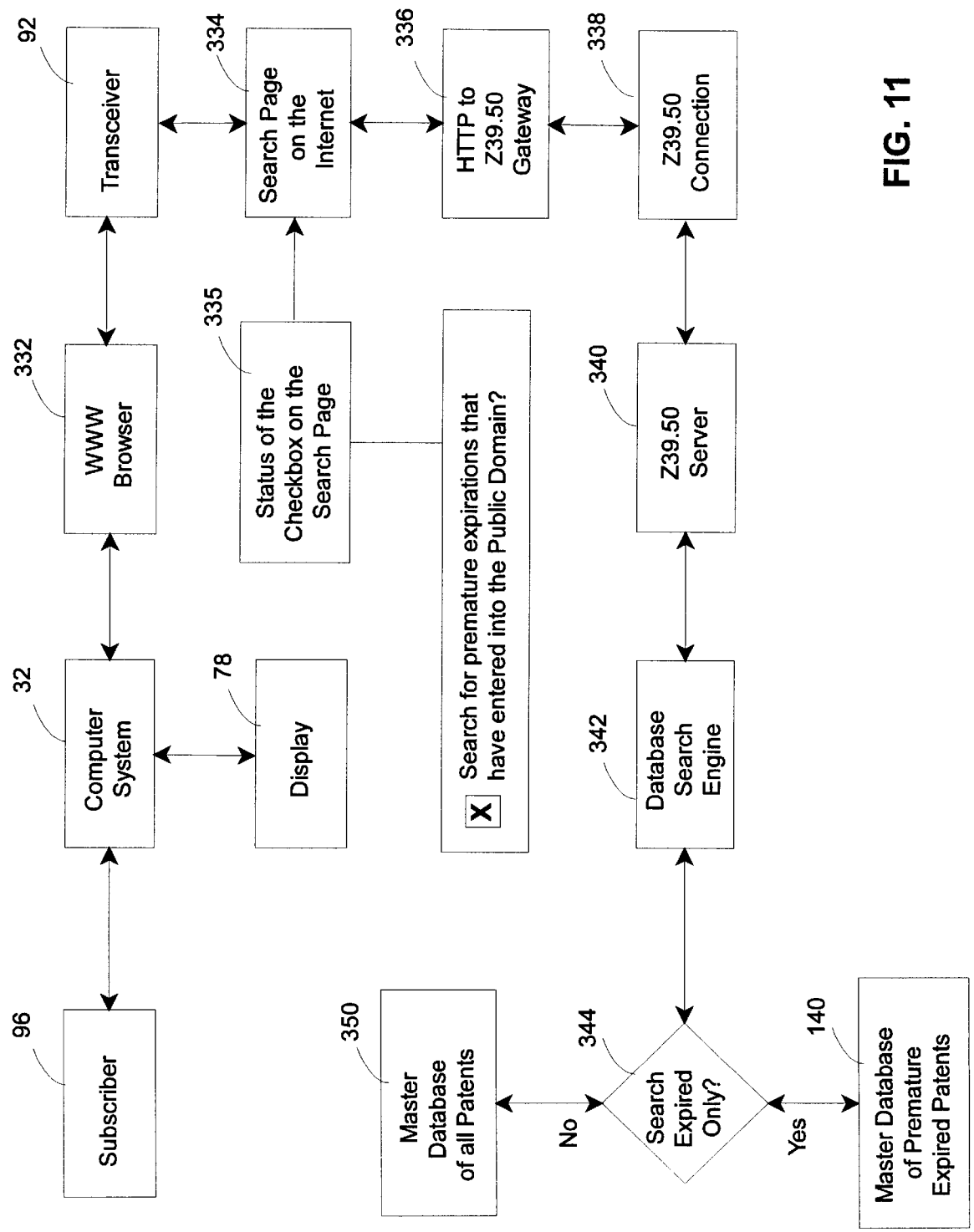
FIG. 11 is a flowchart showing how a partitioned database of premature expired patents is accessed on-line via the Internet in accordance with the present invention.

Turning now to FIG. 11, a subscriber 96 performs a query on a web page 334 at a web site on the Internet via the transceiver 92 of a computer system 32 by using a World Wide Web (WWW) browser 332 which is a program that interprets many different on-line protocols and displays 78 such information received by these protocols in a desired manner to the subscriber 96. One such protocol called the HyperText Transfer Protocol (HTTP) is the most common method to access information via the web pages 334 of a Web server on the Internet. Requests for information accessed are sent and received in the form of HyperText Markup Language (HTML) which is an understood format for the HTTP. Another communications protocol that has been universally accepted as a standard for on-line database searching is called the Z39.50 protocol. The Z39.50 server 340 accepts TCP connections from the transceiver 92 of a computer system 32 and requests to search and retrieve from available databases accessible through the database search engine 342. When a subscriber 96 requests a patent search at the provider's search page 334 on the Internet, a connection to the correct database is established before a query session can begin. The status of a checkbox 335 is assessed to see if the subscriber would like to intentionally search for premature expirations that have entered into the public domain. The WWW browser 332 connects to the HTTP server 334 at a web site on the Internet and posts a HTML form containing information related to a new or existing Z39.50 session. The Z39.50 gateway 336 parses the HTML form and starts a new Z39.50 connection 338 or connects to an existing Z39.50 connection 338. The subscriber's request is then passed from the Z39.50 gateway 336 to the appropriate Z39.50 connection 338 which in turn communicates with the remote Z39.50 server 340. A query is extracted from the parsed HTML form and is passed on from the Z39.50 server to the database search engine 342 for obtaining search results. Based on the status of the checkbox 335, the search engine 342 decides 344 to query either the premature expired patent database 140 or the entire patent database 350. The search and retrieval of premature expired patents can be obtained regardless of which database is being used. The results are passed back from the Z39.50 server 340 to the Z39.50 connection 338, back to the Z39.50 gateway 336, to the HTTP server 334 and back to the WWW browser 332 for display 78 to the subscriber 96. The Z39.50 gateway 336 process then exits, but the associated Z39.50 connection 338 process stays, holding open the Z39.50 connection 338. If a Z39.50 connection 338 process receives no input for a pre-configured period of time, then the connection times out and exits.

Figure 12A:
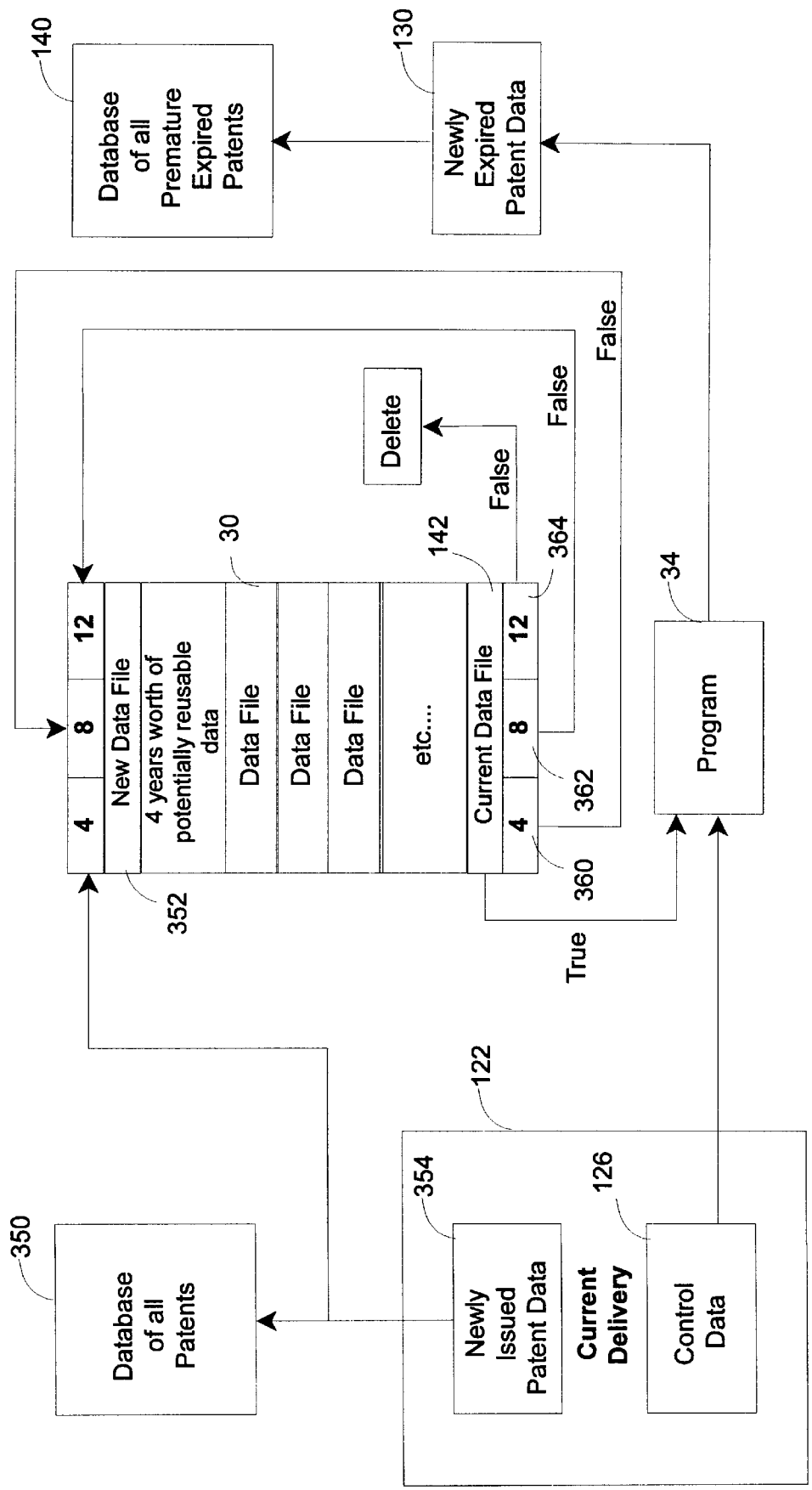
FIG. 12a is a flow chart of the steps taken to update the master databases and create a new file of potentially reusable data from a current delivery in accordance with the present invention.
Figure 12B:
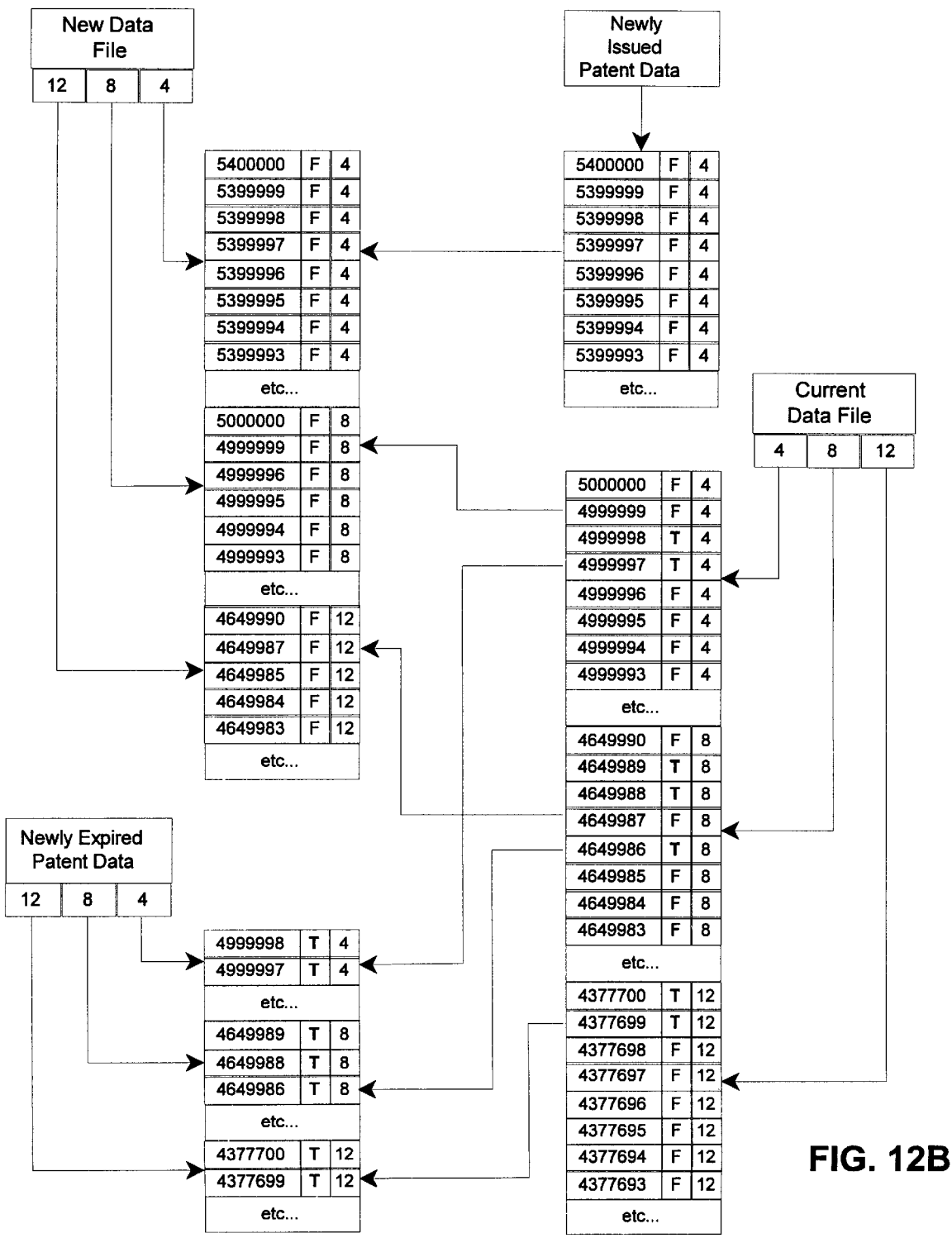
FIG. 12b is a diagram of the relationship of the data structures needed to create a new file of potentially reusable data in accordance with the present invention.

Referring now to FIG. 12a, steps are shown to update a master database of all patents 350, a master database of premature expired patents 140, and create a new file 352 of potentially reusable data 30. A program 34 is executed to receive a current delivery 122 of data containing both newly issued patent data 354 and control data 126. The newly issued patent data 354 is appended to update the master database of all patent information 350. As previously discussed, all records having a logical value of TRUE in the expired field of the current data file 142 are extracted by the program 34 to form the newest premature expired patents 130, which in turn is appended to update the master database of all premature expired patents 140. A new file 352 of potentially reusable data 30 is created by copying newly issued patent data 354 to a new data file 352. The expired level field of the current data file 142 is then incremented to the next potential expiration level and is modified by replacing a 4 with an 8, and an 8 with a 12 for all four 360 and eight year 362 records having a logical value of FALSE in the expired field of the current data file 142. The modified data is then appended to the new data file 352 creating a new file 352 of potentially reusable data 30. The next level of expiration for twelve year 364 records having a logical value of FALSE are final. Therefore, the twelve year 364 records have no further use. All records of the current data file 142 have been updated and put into other files and in turn, have no further use. The current data file 142 is then deleted. A block diagram of FIG. 12b further illustrates the relationships of the data structures involved for creating a new file of potentially reusable data as discussed in FIG. 12a.

Figure 13:
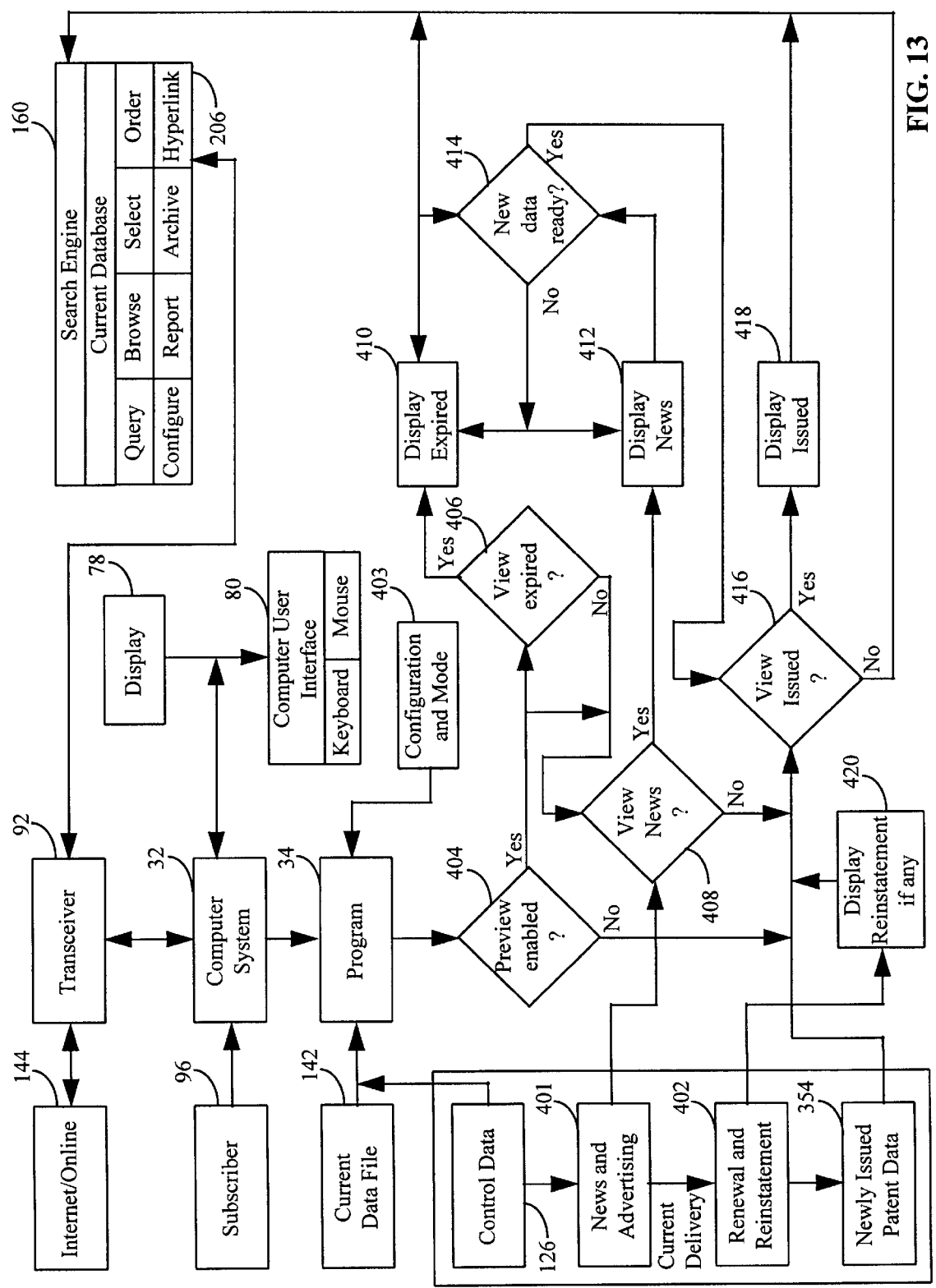
FIG. 13 is a flow chart showing the relationship of sending new data in conjunction with control data in accordance with the present invention.

The flowchart of FIG. 13, shows the utilization of the time delay between receiving the newest patents that have prematurely expired 130, and newly issued patents 354. A subscriber 96 obtains a current delivery 400 including control data 126, news and advertising data 401, renewal, reinstatement and other status data 402, and newly issued patent data 354 by launching a program 34 that receives the current delivery 400 from the Internet 144 via the transceiver 92 of the computer system 32. Because of download size, installation, and remote indexing, the total delivery can take up to 15 minutes to view newly issued patent information 354. This download time can be utilized by viewing the newest premature expired patent information 130 and/or patent news and advertising of current events 401. Also, there are options to display any reinstatement information 420 that might be present. The files are downloaded in a batch where the control data 126 takes seconds to receive. In turn, news and advertising data 401 can take less than 60 seconds to be received. Advantage can be taken of the multitasking operating system and if so desired, build and view the newest premature expirations 130 in less than 90 seconds. While the newly issued data 354 is downloading, the program 34 retrieves configuration 403 information to determine if the preview mode is enabled 404 and if the preview mode 403 is automated. When the preview feature is enabled 404, a message is displayed 78 to view current expirations 406. If so, expirations are viewed 410 with search capabilities 160 until data is ready 414 with the option of viewing news 412 if enabled. If not, another message is displayed 78 to view the latest news and advertising 408. If so, news and advertising are viewed 412. When data is ready 414, or both the expirations 406 and news 408 are not to be viewed, or the automated preview service 404 is disabled, then a message is displayed 78 to ask if newly issued patents are to be viewed 416. If so, newly issued patents 354 are viewed 416 with search capabilities 160. If not, then the search engine 160 is entered. If the preview mode 403 is automated, then the above choices and messages are bypassed and subscriber 96 preferences are retrieved from configuration 403 to determine what preview features to display 78. At this point, the subscriber 96 can operate a computer user interface 80 (such as a keyboard, mouse, etc.) to configure, query, browse, select, report, archive, order, or hyperlink 206 from the search engine 160 and connect to the Internet 144 or other on-line services via the transceiver 92 of the computer system 32 to view a selected document image and send order 206 or other information to the provider 94 for further document delivery.

Turning now to FIG. 14, the data structures for status information are shown. It is necessary to extend the data structures of patent database information 422 to manage status updates. Fields 1 through 6 are used to list the most recent status change of premature expirations, reinstatements, and renewal of maintenance fees. Field 7 lists the potential date of expiration and field 8 shows a complete history of expiration updates in fields 1 through 6. There is a lookup table 424, that have 13 possible outcomes denoted by the characters A through M to determine the status history of a premature expiration during the patent's enforcement. The outcome corresponds to field 8 in the previous data structure 422. An example of the continued update for a given record 426 is provided. When a maintenance fee is paid 428, the renewal flag (field 3) is modified to a TRUE. In turn, the expired level (field 2), the potential expiration date (field 7), and the expiration status history are advanced to the eight year level. When the patent prematurely expires 430, the expired flag (field 1) is modified to a TRUE and the status history (field 8) is updated. When a late fee is paid 432, the renewal flag (field 3) and the reinstatement flag (field 5) are modified to a TRUE, the expired flag (field 1) is modified to a FALSE, and all other status records are advanced to the next level. Status updates are performed with respect to the anticipation of a future event to assure that the final step of updating is reduced to, if and when possible, the change of a single status bit only (ie. upon the update of a premature expiration, the potential expiration date (field 7) becomes the actual expiration date). The usage for status updates are shown for example, by querying for all FALSE expired flags (field 1) and grouping data by potential expiration date (field 7). The updated data structures are then used to generate a batch of data files that include potentially reusable data 30 and placed on a portable storage media or sent to a subscriber for immediate transmission.

Figure 15:
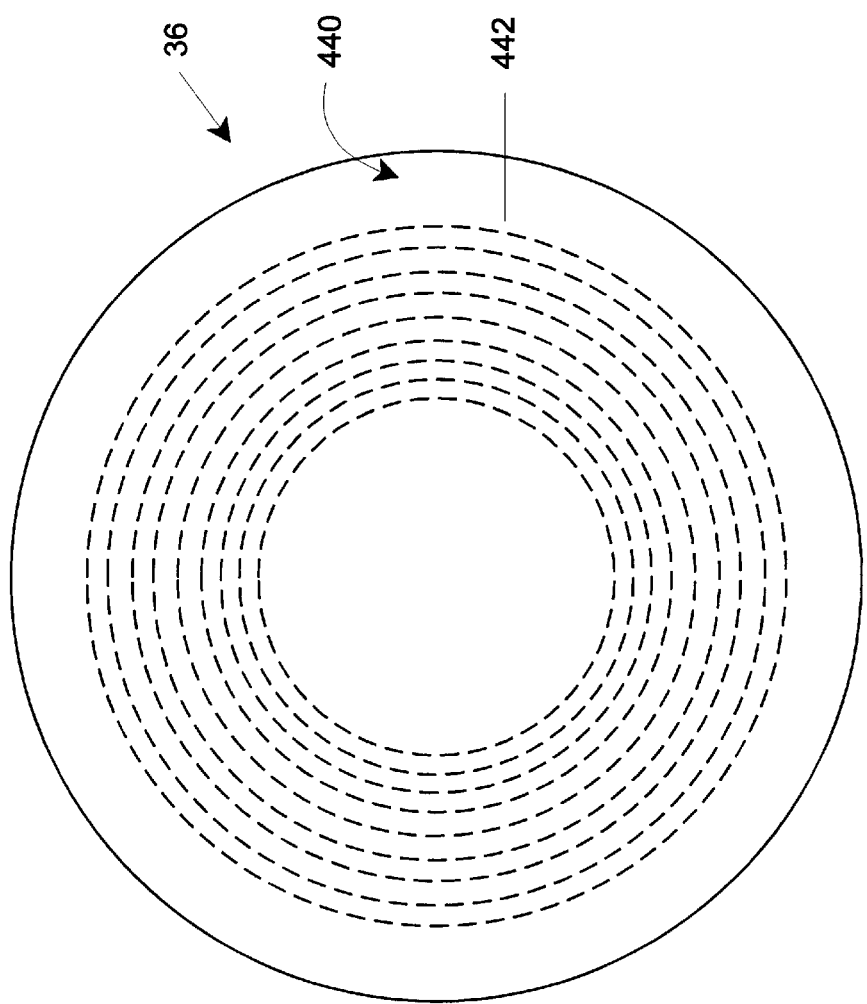
FIG. 15 is an elevation view of a portable storage medium in accordance with the present invention.

Turning now to FIG. 15, a preferred portable storage medium 62 is shown in accordance with the present invention. The preferred storage medium 62 is a diskette with representative tracks 440, each track 440 having sectors 442 such as for example sector 442. In the preferred aspect all tracks 440 contain two additional sectors 442 to provide for 160 KB of hidden partitions on an 80-track diskette. The update data of a current delivery 400 including control data 126, news and advertising data 401, renewal, reinstatement and other status data 402 is stored thereon so as to be inaccessible to some degree to conventional programs. The newly issued patent data 354 of the current delivery 400 is stored on the conventional storage portion of the diskette. By storing the current delivery of update data 400 in the hidden partitions, conventional storage capacity of the storage medium 62 is not reduced. The current delivery 400 is preferably stored in a compressed form and decompressed prior to installation to system.

The two additional sectors 442 at the end of each track 440 provide a rotational delay between the last conventional sector 442. The delay provides the disk drive enough time to reposition the head on the next track 440 before the first sector 442 of the next track 440 passes under the head thereby speeding up access to data on the diskette. However, it will be appreciated that the present invention has applicability to any suitable storage medium 62 (e.g., diskette, CD-ROM, tape drive, etc.).

Figure 16:
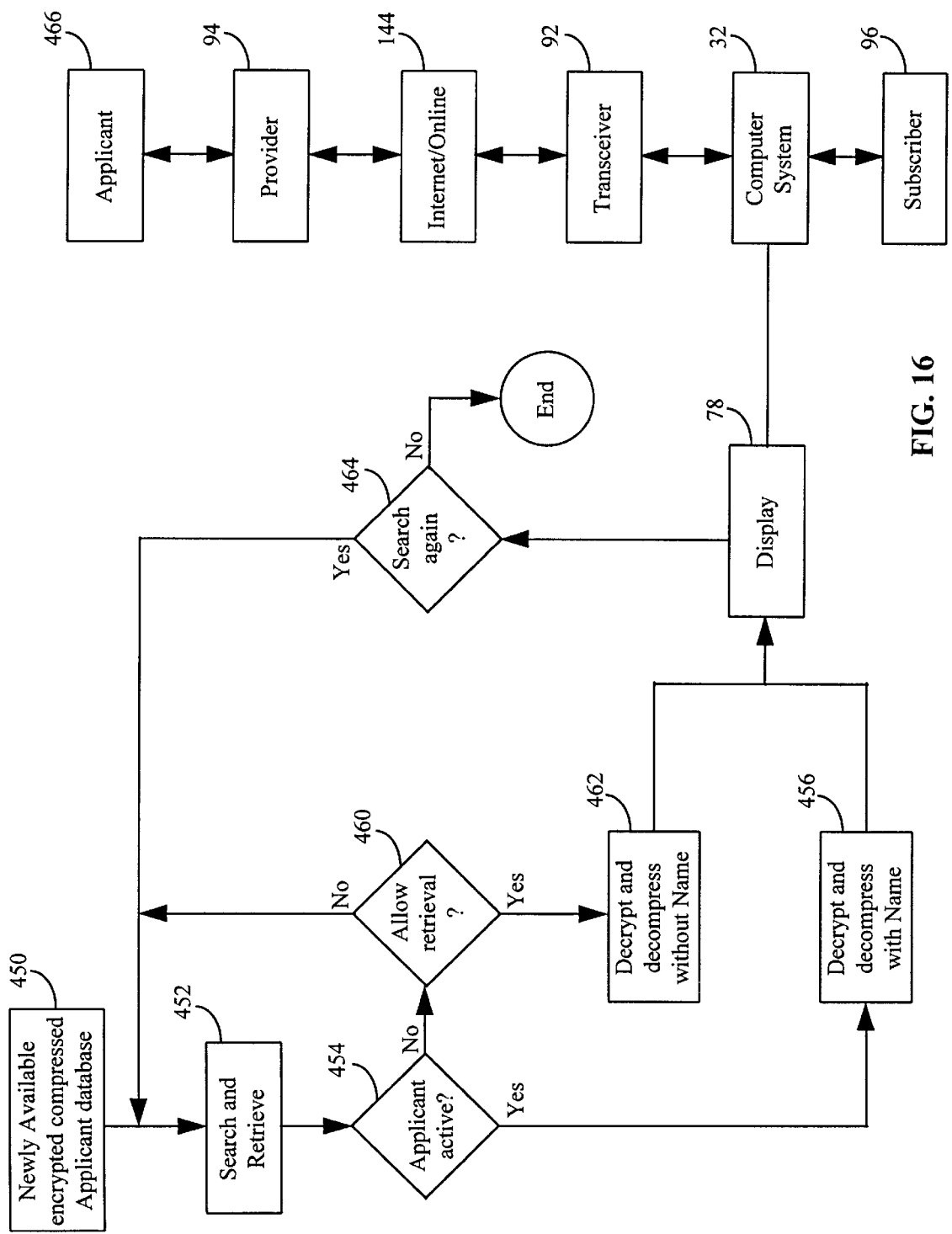
FIG. 16 is a flow chart showing how encryption and compression can be used in accordance with an alternative aspect of the present invention.

As stated, this invention is not limited to patents or other information that passes into the public domain, such as trademarks, domain names, and copyrights. The invention is also used to extend the reuse of information that has an ever-changing availability such as, but not limited to, homes for sale, job availability, seasonal advertising, coupons, and personal ads, etc. For instance, the listings of 800,000 job descriptions are placed on DVD-ROM and each week receive a 100K e-mail file of control data to trigger which records to index and to display which jobs are available. In another example, the resumés of job applicants are placed on DVD-ROM. The applicants are either on or off the job search market for a given interval. The applicant may still want to be searched or notified by an employer or recruiter even when the applicant is off the market. The flowchart of FIG. 16 shows an aspect that reuses the resumé information of job applicants. All applicant information is encrypted and compressed 450 for privacy. A search 452 is performed where the retrieval 452 of the search 452 is displayed 78 based on the applicant's status. All records where the status of the applicant is active 454 are decrypted and decompressed, and resumé information including their name 456 is displayed 78. If the status is not active 454, another status is checked for anonymous retrieval 460. All records where retrieval 452 is not allowed 460 are skipped. When retrieval 452 of the applicant is allowed 460, all records of resume information without the applicant's name 462 are then decrypted and decompressed for display 78. After all records are displayed 78, the program can perform another search 464. If the subscriber 96 is interested in contacting the anonymously represented applicant 466, the provider 94 can be contacted by telephone or through the Internet 144 via the transceiver 92 of the computer system 32 to act as an intermediary and broker the negotiations between the subscriber 96 and applicant 466.

The practice of encryption and compression is not limited to this aspect but rather can be applied to the invention in general Control data is the representation of an updated status that is dependent upon three cases; knowing when a status will change but not what, knowing what status will be changed but not when, and knowing neither what status will be changed nor when a status will change. The aspects discussed focus primarily on the change in status of potentially reusable data. For example, in coupon and advertising delivery applications, information such as updated pricing, expiration dates, locations, and other pertinent data is sent in conjunction with the control data to form the newly indexed available information. Also, indexes are not limited to being created remotely at the subscriber site. For cases where the delivery time of the indexes does not exceed the time needed to create the indexes at the subscriber site, the indexes are sent by the provider. The control data identifies the most efficient way to send update information of the present aspect. Data updates are not limited to being sent in the form of control data. A database of premature expired patent numbers can be sent instead. Furthermore, potentially reusable data can be more specifically defined in terms of potentially usable and/or potentially reusable data. Press releases, wills, and the declassification of confidential information have a one-time use at a future date and serve as examples of potentially usable data.

The invention has use in a business/legal environment. For example, reference files are maintained containing data that is used in conjunction with various software applications. For instance in a law firm database, rules, regulations, citations, and various statutory dates and deadlines are stored in files that are referenced by software applications that use the reference data in making computations and decisions. If the reference data is incorrect, then it is highly probable that the output computation and/or decision made by the software is erroneous. Thus, if update reference data were stored in conjunction with regular data that is to be applied to the system (in a similar manner to that described above with respect to the data reference updates), the system would be using the most recent reference data.

Further uses of the present invention include, configuring the user-defined preset query to flag a group of patents that the subscriber is licensing technology from. This customized information assures the subscriber that they're not continuing to pay licensing or royalty fees on a premature expired patent. By gaining competitive intelligence on abandoned patents and technologies, a subscriber can better evaluate the research and development costs of similar work. For example, a corporation will seek the counsel of a patent law firm to evaluate the potential of their new product to infringe on the intellectual property of a competitor. A competitive intelligence search is performed by the law firm, and all patents and trademarks in question are further searched for premature patent and trademark expiration as information to be used in advising the client of the possibility of infringement.

By providing premature expired patents that can be made, used, or sold by anyone, the use of the clipping service to automate subscriber access allows for a new non-technical audience outside of the legal, corporate, and scientific communities to become familiarized with the patent system. Via the Internet, this information can be disseminated to any person in the world with access to a computer. In addition, professors of science and engineering at universities can now incorporate this lapsed property for use in their syllabus in the form of lab experiments and homework assignments.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. The present invention includes all such equivalents and modifications, and is limited only by the scope of the following claims.

I claim:

1. In a computer network having a provider computer system and a subscriber computer system having a storage facility with an executable computer program and at least one data file having potentially reusable data stored therein and at least one communication link connecting the provider computer system and the subscriber computer system, a computer implemented method comprising the steps of:

a) periodically downloading, from said provider computer system, first data comprising newly issued data having at least one issue date and at least one expiry date;

b) periodically downloading second data, from said provider computer system, including control data, said control data indicating whether the second data is to be maintained in a subset of the records of the at least one data file, said control data corresponding to at least one record of the potentially reusable data; and c) executing said computer program on said subscriber computer system to combine said second data with the at least one data file to create third data of new use comprising updated subset of said potentially reusable data, wherein said third data includes at least one data file of newly issued information.

2. The method of claim 1, wherein the second data is unknown at the time of storing the first data.

3. The method of claim 1, wherein the step of creating the third data includes the step of executing the program for combining the second data with the at least one data file to form at least one newly indexed data file.

4. The method of claim 3, further including the step of using a search engine to search and retrieve from the third data or the newly issued data.

5. The method of claim 1, further including the step of executing the program to configure, query, browse, select, report, archive, order, or hyperlink to the internet from the third data or the newly issued data.

6. The method of claim 1, further including the step of executing the program to create new potentially reusable data by combining the newly issued data and all records of the potentially reusable data which do not correspond to the control data.

7. The method of claim 1, wherein the third data is automatically created upon delivery of the second data.

8. The method of claim 1, wherein the third data is automatically filtered and displayed by a preset user defined query upon creation of the third data.

9. The method of claim 1, wherein the third data includes newly indexed available information.

10. The method of claim 1, wherein the first data and the second data are received during the same download.

11. The method of claim 10, wherein the second data further includes news and advertising data.

12. The method of claim 11, wherein the second data is received first and used to create the third data for displaying the third data or the news and advertising data while the first data is still downloading.

13. The method of claim 1, wherein the storage medium is a hard drive.

14. The method of claim 1, wherein said storage includes a portable storage medium comprising a hidden partition comprising storage space inaccessible to conventional programs and not reducing conventional storage capacity of the portable storage medium, wherein the control data is stored thereon.

15. The method of claim 1, wherein said potentially reusable data includes information such as but not limited to patents, trademarks, domain names, copyrights, real estate, job descriptions, resumes, coupons, advertising, personal ads, rules, regulations, citations, press releases, and confidential information.

16. The method of claim 1, wherein said potentially reusable data is partitioned by issue date or by date of potential expiration.

17. A computer apparatus for periodically updating files on a computer network comprising a provider computer system and a subscriber computer system having a storage facility with an executable computer program and at least one data file having potentially reusable data stored therein and at least one communication link connecting the provider computer system and the subscriber computer system comprising:

a) means for periodically downloading, from said provider computer system, first data comprising newly issued data having at least one issue date and at least one expiry date;

b) means for periodically downloading second data, from said provider computer system, including control data, said control data indicating whether the second data is to be maintained in a subset of the records of the at least one data file, said control data corresponding to at least one record of the potentially reusable data; and c) means for executing said computer program on said subscriber computer system to combine said second data with the at least one data file to create third data of new use comprising updated subset of said potentially reusable data, wherein said third data includes at least one data file of newly issued information.

18. The computer apparatus of claim 17, wherein the third data is automatically updated upon delivery of the second data.

19. The computer apparatus of claim 17, wherein the third data is automatically filtered and displayed by a preset user defined query upon update of the third data.

20. The computer apparatus of claim 17, wherein the third data includes newly indexed available information.

21. The computer apparatus of claim 17, wherein the storage medium is a hard drive.

22. The computer apparatus of claim 17, wherein said storage includes a portable storage medium comprising a hidden partition comprising storage space inaccessible to conventional programs and not reducing conventional storage capacity of the portable storage medium, wherein the control data is stored thereon.

23. The computer apparatus of claim 17, wherein said potentially reusable data includes information such as but not limited to patents, trademarks, domain names, copyrights, real estate, job descriptions, resumes, coupons, advertising, personal ads, rules, regulations, citations, press releases, and confidential information.

24. The computer apparatus of claim 17, wherein said potentially reusable data is partitioned by issue date or by date of potential expiration.

25. A computer readable medium having executable computer instructions that executes the method steps of any claims 1 or 2 or 3 or 4 or 5 or 6 or 7 or 8 or 10 or 12 or 14 or 15 or 16.

* * * * *